US009832733B2

(12) United States Patent
Gao et al.

(10) Patent No.: US 9,832,733 B2
(45) Date of Patent: Nov. 28, 2017

(54) METHOD AND APPARATUS FOR OBTAINING UPLINK TRANSMISSION POWER CONTROL COMMANDS FROM A IDENTIFIED LOCATION OF A PHYSICAL DOWNLINK CONTROL CHANNEL

(71) Applicant: China Academy of Telecommunications Technology, Beijing (CN)

(72) Inventors: Xuejuan Gao, Beijing (CN); Yanan Lin, Beijing (CN); Zukang Shen, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 33 days.

(21) Appl. No.: 14/759,411

(22) PCT Filed: Jan. 10, 2014

(86) PCT No.: PCT/CN2014/070461
§ 371 (c)(1),
(2) Date: Jul. 7, 2015

(87) PCT Pub. No.: WO2014/108094
PCT Pub. Date: Jul. 17, 2014

(65) Prior Publication Data
US 2015/0358917 A1    Dec. 10, 2015

(30) Foreign Application Priority Data
Jan. 10, 2013    (CN) .......................... 2013 1 0009440

(51) Int. Cl.
*H04W 52/14*    (2009.01)
*H04W 72/04*    (2009.01)
(Continued)

(52) U.S. Cl.
CPC ........... *H04W 52/146* (2013.01); *H04L 5/001* (2013.01); *H04W 52/54* (2013.01);
(Continued)

(58) Field of Classification Search
CPC .... H04L 5/001; H04W 52/146; H04W 52/16; H04W 52/325; H04W 52/34; H04W 52/54; H04W 72/042; H04W 72/0473
See application file for complete search history.

(56) References Cited

U.S. PATENT DOCUMENTS 9,674,791 B2 *    6/2017    Li ....................... H04W 52/146
2010/0254329 A1*    10/2010    Pan ........................ H04L 5/001
370/329
(Continued)

FOREIGN PATENT DOCUMENTS

CN    101772179 A    7/2010
CN    101998611 A    3/2011
(Continued)

OTHER PUBLICATIONS

Sharp: "Cross carrier power control with group TPC commands". 3GPP Draft; R1-104517. 3rd Generation Partnership Project (3GPP). Mobile Competence Centre ; 650, Route Des Lucioles ; F-06921 Sophia-Antipolis Cedex ; France. vol. RAN WG1, no. Madrid, Spain; Aug. 23, 2010. Aug. 17, 2010 (Aug. 17, 2010). XP050449822. [retrieved on Aug. 17, 2017].
(Continued)

*Primary Examiner* — Devan Sandiford
(74) *Attorney, Agent, or Firm* — Kilpatrick Townsend & Stockton LLP

(57) ABSTRACT

Disclosed are a method and apparatus for transmitting a power control command. The method for a UE side thereof comprises: determining a TPC-RNTI corresponding to each carrier group and a tpc-index corresponding to each carrier
(Continued)

group; detecting a PDCCH adopting a DCI format 3/3A and scrambled by using the TPC-RNTI corresponding to each carrier group in a common search space of a PCC; and according to the tpc-index corresponding to each carrier group, determining the position of an uplink power control command corresponding to the carrier group in the detected PDCCH scrambled by using the TPC-RNTI corresponding to the carrier group, and acquiring the uplink power control command corresponding to the carrier group from a corresponding position. Thus, a user equipment transmits a corresponding uplink power control command while supporting that uplink channels are transmitted over different uplink carriers corresponding to different carrier groups, thereby guaranteeing the normal and stable operation of a system.

16 Claims, 8 Drawing Sheets

(51) Int. Cl.
  *H04W 52/54* (2009.01)
  *H04L 5/00* (2006.01)
  *H04W 52/16* (2009.01)
  *H04W 52/32* (2009.01)
  *H04W 52/34* (2009.01)

(52) U.S. Cl.
  CPC .......... *H04W 72/042* (2013.01); *H04W 52/16* (2013.01); *H04W 52/325* (2013.01); *H04W 52/34* (2013.01); *H04W 72/0473* (2013.01)

(56) References Cited

U.S. PATENT DOCUMENTS

| | | | | |
|---|---|---|---|---|
| 2010/0296467 A1* | 11/2010 | Pelletier | .............. | H04W 74/002 370/329 |
| 2011/0081939 A1* | 4/2011 | Damnjanovic | ....... | H04W 52/08 455/522 |
| 2012/0087334 A1* | 4/2012 | Suzuki | .................... | H04L 5/001 370/329 |
| 2012/0195267 A1* | 8/2012 | Dai | ...................... | H04L 1/0072 370/329 |
| 2012/0224553 A1 | 9/2012 | Kim et al. | | |
| 2013/0010659 A1* | 1/2013 | Chen | ....................... | H04L 5/001 370/280 |
| 2013/0010711 A1* | 1/2013 | Larsson | ............ | H04W 56/0005 370/329 |
| 2013/0155868 A1* | 6/2013 | Seo | ................... | H03M 13/3723 370/241 |
| 2014/0269454 A1* | 9/2014 | Papasakellariou | .... | H04W 52/34 370/280 |
| 2015/0029910 A1* | 1/2015 | He | ........................ | H04W 76/02 370/280 |
| 2015/0215097 A1* | 7/2015 | Yi | ......................... | H04W 52/48 370/329 |
| 2015/0263829 A1* | 9/2015 | Nguyen | ............ | H04W 72/1289 370/280 |
| 2015/0271006 A1* | 9/2015 | Han | ........................ | H04L 1/001 370/329 |
| 2015/0271807 A1* | 9/2015 | Patil | .................... | H04W 76/023 455/426.1 |
| 2015/0358918 A1* | 12/2015 | Gao | ..................... | H04W 52/146 455/522 |
| 2015/0358927 A1* | 12/2015 | Gao | ..................... | H04W 52/365 370/329 |
| 2016/0127999 A1* | 5/2016 | Li | ........................ | H04W 52/16 370/294 |
| 2016/0227486 A1* | 8/2016 | Park | .................... | H04W 52/146 |

FOREIGN PATENT DOCUMENTS

| | | |
|---|---|---|
| CN | 102550090 A | 7/2012 |
| CN | 102804868 A | 11/2012 |
| EP | 2400802 A1 | 12/2011 |
| WO | 2011082744 A2 | 7/2011 |

OTHER PUBLICATIONS

The Extended European Search Report dated Oct. 9, 2015 in the EP counterpart application (14737664.4).
LG Electronics: "UL TPC for LTE-Advanced", 3GPP Draft; R1-100217 LTEA_UL TPC Command, $3^{rd}$ Generation Partnership Project (3GPP), Mobile Competence Centre ; 650, Route Des Lucioles ; F-06921 Sophia-Antipolis Cedex ; France, vol. RAN WG1, no. Valencia, Spain; Jan. 18, 2010, Jan. 18, 2010 (Jan. 12, 2010), XP050417909, [retrieved on Jan. 12, 2010].

* cited by examiner

METHOD AND APPARATUS FOR OBTAINING UPLINK TRANSMISSION POWER CONTROL COMMANDS FROM A IDENTIFIED LOCATION OF A PHYSICAL DOWNLINK CONTROL CHANNEL

This application is a US National Stage of International Application No. PCT/CN2014/070461, filed on Jan. 10, 2014, designating the United States and claiming the priority to Chinese Patent Application No. 201310009440.9, filed with the State Intellectual Property Office of People's Republic of China on Jan. 10, 2013 and entitled "Method and device for transmitting uplink power control command", the content of which is hereby incorporated by reference in its entirety.

FIELD

The present invention relates to the field of communications and particularly to a method and device for transmitting an uplink power control command.

BACKGROUND

PUCCH Power Control Among LTE Systems

Only transmission of a Physical Uplink Control Channel (PUCCH) on a Primary Component Carrier (PCC) is supported in a Long Term Evolution (LTE) system. PUCCH transmit power is adjusted in each transmission sub-frame according to a corresponding uplink Transmit Power Control (TPC) command which can be obtained in the following two approaches:

In a first approach, the TPC command is obtained from a TPC field in a Physical Downlink Control Channel (PDCCH), or an Enhanced PDCCH, corresponding to the PCC, using the Downlink Control Information (DCI) format 1A/1B/1D/1/2A/2/2B/2C/2D and scrambled with a Cell-Radio Network Temporary Identifier (C-RNTI).

In a second approach, the TPC command is obtained from a PDCCH or an EPDCCH, transmitted in a Common Search Space (CSS) of a PCC, using the DCI format 3/3A and scrambled with a TPC-PUCCH-RNTI. This approach is a TPC multicast approach in which uplink TPC commands of a plurality of User Equipments (UEs) can be transmitted in the same PDCCH, and each of the UEs obtains its own uplink TPC command in the TPC multicast command according to a Transmit Power Control-index (TPC-index) preconfigured by an higher layer.

When the UE detects both of the PDCCHs transmitted in the two approaches above, the UE adjusts the power according to the uplink TPC command in the PDCCH obtained in the first approach.

Carrier Aggregation

Carrier Aggregation (CA) has been introduced to the Long Term Evolution-Advanced (LTE-A) system so that a plurality of consecutive or inconsecutive carriers served by the same evolved Node B (eNB) are aggregated together to serve the UE concurrently. These carriers aggregated together are referred to as Component Carriers (CCs). Each cell can be a component carrier, and cells (component carriers) served by different eNBs cannot be aggregated. The bandwidth of each carrier cannot go beyond 20 MHz for back compatibility with an LTE UE.

One of the component carriers aggregated for the UE is defined as a Primary Component Carrier (PCC), and the other component carriers are referred to as Secondary Component Carriers (SCCs).

Carrier aggregation of a Frequency Division Duplex (FDD) carrier and a Time Division Duplex (TDD) carrier may be supported in an evolved system subsequent to the LTE-A system. Since the FDD carrier operates in a different operating mode from the TDD carrier, a new uplink Acknowledge/Negative Acknowledge (ACK/NACK) transmission solution may be introduced, that is:

The eNB groups aggregated downlink carriers into N sets $S_i$ of downlink carriers so that a downlink carrier belongs to only one set of downlink carriers, and carriers in a set of downlink carriers operates in the same duplex mode. All of TDD carriers in a set of carriers operate in the same TDD uplink/downlink configuration.

The eNB configures an uplink carrier $C_{UL,i}$ for the set $S_i$ of downlink carriers so that the uplink carrier $C_{UL,i}$ operates in the same duplex mode as the set of downlink carriers. If the downlink carriers are TDD carriers, then the uplink carrier operates in the same TDD uplink/downlink configuration as the corresponding set of downlink carriers. There are different uplink carriers corresponding to different sets of downlink carriers.

ACK/NACK information corresponding to downlink data received in the set $S_i$ of downlink carriers is transmitted in a PUCCH on the uplink carrier $C_{UL,i}$.

There has been absent a corresponding solution to transmission of an uplink power control command when the UE supports transmission of PUCCHs on different uplink carriers corresponding to different sets of carriers.

SUMMARY

An object of the invention is to provide a method and device for transmitting an uplink power control command so as to address the problem of how to transmit the uplink power control command when a UE supports transmission of PUCCHs on different uplink carriers corresponding to different sets of carriers.

The object of the invention is attained by the following technical solutions:

In a first aspect, a method for transmitting an uplink power control command includes:

determining transmit power control-radio network temporary identifiers corresponding to respective sets of carriers and transmit power control-indexes corresponding to the respective sets of carriers;

detecting physical downlink control channels using the downlink control information format 3/3A and scrambled with the transmit power control-radio network temporary identifiers corresponding to the respective sets of carriers in a common search space of a primary component carrier; and determining the locations, of uplink transmit power control commands corresponding to the respective sets of carriers, in the detected physical downlink control channels scrambled with the transmit power control-radio network temporary identifiers corresponding to the sets of carriers according to the transmit power control-indexes corresponding to the sets of carriers, and obtaining the uplink transmit power control commands corresponding to the sets of carriers at the corresponding locations.

In connection with the first aspect, in a first possible implementation, determining the transmit power control-radio network temporary identifiers corresponding to the respective sets of carriers and the transmit power control-indexes corresponding to the respective sets of carriers includes any one of the following approaches:

a first approach where:

determining a transmit power control-radio network temporary identifier corresponding to the user equipment as indicated by higher-layer signaling or as predefined with the network side, wherein the transmit power control-radio network temporary identifier corresponding to the user equipment is used as the transmit power control-radio network temporary identifier corresponding to each set of carriers of the user equipment; and determining the transmit power control-indexes corresponding to the respective sets of carriers as indicated by higher-layer signaling or as predefined with the network side, wherein transmit power control-indexes corresponding to different sets of carriers are different from each other; or determining a transmit power control-index corresponding to the user equipment, and transmit power control-index-offsets corresponding to the respective sets of carriers as indicated by higher-layer signaling or as predefined with the network side, and determining the transmit power control-indexes corresponding to the respective sets of carriers according to the transmit power control-index corresponding to the user equipment, and the transmit power control-index-offsets corresponding to the respective sets of carriers, wherein transmit power control-indexes corresponding to different sets of carriers are different from each other;

a second approach where:

determining the transmit power control-radio network temporary identifiers corresponding to the respective sets of carriers as indicated by higher-layer signaling or as predefined with the network side, wherein transmit power control-radio network temporary identifiers corresponding to different sets of carriers are different from each other; and determining a transmit power control-index corresponding to the user equipment as indicated by higher-layer signaling or as predefined with the network side, wherein the transmit power control-index corresponding to the user equipment is used as the transmit power control-index corresponding to each set of carriers of the user equipment; or determining the transmit power control-indexes corresponding to the respective sets of carriers as indicated by higher-layer signaling or as predefined with the network side; or determining a transmit power control-index corresponding to the user equipment, and transmit power control-index-offsets corresponding to the respective sets of carriers as indicated by higher-layer signaling or as predefined with the network side, and determining the transmit power control-indexes corresponding to the respective sets of carriers according to the transmit power control-index corresponding to the user equipment, and the transmit power control-index-offsets corresponding to the respective sets of carriers;

a third approach where:

determining the transmit power control-radio network temporary identifiers corresponding to the respective sets of carriers as indicated by higher-layer signaling or as predefined with the network side, wherein not all of transmit power control-radio network temporary identifiers corresponding to different sets of carriers are the same; and determining the transmit power control-indexes corresponding to the respective sets of carriers as indicated by higher-layer signaling or as predefined with the network side, wherein sets of carriers corresponding to the same transmit power control-radio network temporary identifier correspond to different transmit power control-indexes; or determining a transmit power control-index corresponding to the user equipment, and transmit power control-index-offsets corresponding to the respective sets of carriers as indicated by higher-layer signaling or as predefined with the network side, and determining the transmit power control-indexes corresponding to the respective sets of carriers according to the transmit power control-index corresponding to the user equipment, and the transmit power control-index-offsets corresponding to the respective sets of carriers, wherein sets of carriers corresponding to the same transmit power control-radio network temporary identifier correspond to different transmit power control-indexes.

In connection with the first possible implementation of the first aspect, in a second possible implementation, in the first approach or the third approach, determining the locations, of the uplink transmit power control commands corresponding to the respective sets of carriers, in the detected physical downlink control channels scrambled with the transmit power control-radio network temporary identifiers corresponding to the sets of carriers according to the transmit power control-indexes corresponding to the sets of carriers, and obtaining the uplink transmit power control commands corresponding to the sets of carriers at the corresponding locations includes:

when a plurality of sets of carriers of the user equipment correspond to the same transmit power control-radio network temporary identifier, determining the locations, of the uplink transmit power control commands corresponding to the respective sets of carriers, in the detected physical downlink control channel scrambled with the transmit power control-radio network temporary identifier according to the transmit power control-indexes corresponding to the respective sets of carriers with the same transmit power control-radio network temporary identifier respectively, and obtaining the uplink transmit power control commands corresponding to the respective sets of carriers at the corresponding locations.

In connection with any preceding possible implementation of the first aspect, in a third possible implementation, the transmit power control-radio network temporary identifier includes a transmit power control-physical uplink control channel-radio network temporary identifier or a transmit power control-physical uplink shared channel-radio network temporary identifier.

In a second aspect, a method for transmitting an uplink power control command includes:

determining transmit power control-radio network temporary identifiers corresponding to respective sets of carriers of a user equipment and transmit power control-indexes corresponding to the respective sets of carriers of the user equipment; and mapping an uplink transmit power control command corresponding to each set of carriers into a corresponding location in a physical downlink control channel using the downlink control information format 3/3A according to the transmit power control-index corresponding to the set of carriers, scrambling the physical downlink control channel with the transmit power control-radio network temporary identifier corresponding to the set of carriers, and transmitting the physical downlink control channel in a common search space of a primary component carrier of the user equipment.

In connection with the second aspect, in a first possible implementation, determining the transmit power control-radio network temporary identifiers corresponding to the respective sets of carriers of the user equipment and the transmit power control-indexes corresponding to the respective sets of carriers of the user equipment includes any one of the following approaches:

a first approach where:

determining a transmit power control-radio network temporary identifier corresponding to the user equipment as predefined with the user equipment, or determining a transmit power control-radio network temporary identifier corresponding to the user equipment, and configuring the user equipment with the transmit power control-radio network temporary identifier in higher-layer signaling, wherein the transmit power control-radio network temporary identifier corresponding to the user equipment is used as the transmit power control-radio network temporary identifier corresponding to each set of carriers of the user equipment; and determining the transmit power control-indexes corresponding to the respective sets of carriers of the user equipment as predefined with the user equipment, or determining the transmit power control-indexes corresponding to the respective sets of carriers of the user equipment, and configuring the user equipment with the transmit power control-indexes in higher-layer signaling, wherein transmit power control-indexes corresponding to different sets of carriers are different from each other; or firstly determining a transmit power control-index corresponding to the user equipment, and transmit power control-index-offsets corresponding to the respective sets of carriers of the user equipment as predefined with the user equipment, or determining a transmit power control-index corresponding to the user equipment, and transmit power control-index-offsets corresponding to the respective sets of carriers of the user equipment, and configuring the user equipment with the transmit power control-index and the transmit power control-index-offsets in higher-layer signaling; and then determining the transmit power control-indexes corresponding to the respective sets of carriers of the user equipment according to the transmit power control-index corresponding to the user equipment, and the transmit power control-index-offsets corresponding to the respective sets of carriers of the user equipment, wherein transmit power control-indexes corresponding to different sets of carriers are different from each other;

a second approach where:

determining the transmit power control-radio network temporary identifiers corresponding to the respective sets of carriers of the user equipment as predefined with the user equipment, or determining the transmit power control-radio network temporary identifiers corresponding to the respective sets of carriers of the user equipment, and configuring the user equipment with the transmit power control-radio network temporary identifiers in higher-layer signaling, wherein transmit power control-radio network temporary identifiers corresponding to different sets of carriers are different from each other; and determining a transmit power control-index corresponding to the user equipment as predefined with the user equipment, or determining a transmit power control-index corresponding to the user equipment, and configuring the user equipment with the transmit power control-index in higher-layer signaling, wherein the transmit power control-index corresponding to the user equipment is used as the transmit power control-index corresponding to each set of carriers of the user equipment; or determining the transmit power control-indexes corresponding to the respective sets of carriers of the user equipment as predefined with the user equipment, or determining the transmit power control-indexes corresponding to the respective sets of carriers of the user equipment, and configuring the user equipment with the transmit power control-indexes in higher-layer signaling; or firstly determining a transmit power control-index corresponding to the user equipment, and transmit power control-index-offsets corresponding to the respective sets of carriers of the user equipment as predefined with the user equipment, or determining a transmit power control-index corresponding to the user equipment, and transmit power control-index-offsets corresponding to the respective sets of carriers of the user equipment, and configuring the user equipment with the transmit power control-index and the transmit power control-index-offsets in higher-layer signaling; and then determining the transmit power control-indexes corresponding to the respective sets of carriers of the user equipment according to the transmit power control-index corresponding to the user equipment, and the transmit power control-index-offsets corresponding to the respective sets of carriers; and a third approach where:

determining the transmit power control-radio network temporary identifiers corresponding to the respective sets of carriers of the user equipment as predefined with the user equipment, or determining the transmit power control-radio network temporary identifiers corresponding to the respective sets of carriers of the user equipment, and configuring the user equipment with the transmit power control-radio network temporary identifiers in higher-layer signaling, wherein not all of the transmit power control-radio network temporary identifiers corresponding to the respective sets of carriers are the same; and determining the transmit power control-indexes corresponding to the respective sets of carriers of the user equipment as predefined with the user equipment, or determining the transmit power control-indexes corresponding to the respective sets of carriers of the user equipment, and configuring the user equipment with the transmit power control-indexes in higher-layer signaling, wherein transmit power control-indexes corresponding to sets of carriers corresponding to the same transmit power control-radio network temporary identifier are different from each other; or firstly determining a transmit power control-index corresponding to the user equipment, and transmit power control-index-offsets corresponding to the respective sets of carriers of the user equipment as predefined with the user equipment, or determining a transmit power control-index corresponding to the user equipment, and transmit power control-index-offsets corresponding to the respective sets of carriers of the user equipment, and configuring the user equipment with the transmit power control-index and the transmit power control-index-offsets in higher-layer signaling; and then determining the transmit power control-indexes corresponding to the respective sets of carriers of the user equipment according to the transmit power control-index corresponding to the user equipment, and the transmit power control-index-offsets corresponding to the respective sets of carriers of the user equipment, wherein transmit power control-indexes corresponding to sets of carriers corresponding to the same transmit power control-radio network temporary identifier are different from each other.

In connection with the first possible implementation of the second aspect, in a second possible implementation, in the second approach or the third approach, mapping the uplink transmit power control command corresponding to each set of carriers into the corresponding location in the physical downlink control channel using the downlink control information format 3/3A according to the transmit power control-index corresponding to the set of carriers, scrambling the physical downlink control channel with the transmit power control-radio network temporary identifier corresponding to the set of carriers, and transmitting the physical downlink control channel in the common search space of the primary component carrier of the user equipment includes:

mapping the uplink transmit power control commands corresponding to the sets of carriers of the user equipment corresponding to different transmit power control-radio network temporary identifiers into multiple physical downlink control channels using the downlink control information format 3/3A and scrambled with the corresponding different transmit power control-radio network temporary identifiers respectively, and transmitting the plurality of physical downlink control channels in the common search space of the primary component carrier of the user equipment respectively in different downlink sub-frames;

or in the first approach or the third approach, mapping the uplink transmit power control command corresponding to each set of carriers into the corresponding location in the physical downlink control channel using the downlink control information format 3/3A according to the transmit power control-index corresponding to the set of carriers, scrambling the physical downlink control channel with the transmit power control-radio network temporary identifier corresponding to the set of carriers, and transmitting the physical downlink control channel in the common search space of the primary component carrier of the user equipment includes:

mapping the uplink transmit power control commands corresponding to the sets of carriers of the user equipment with the same transmit power control-radio network temporary identifier into the same physical downlink control channel using the downlink control information format 3/3A and scrambled with the same transmit power control-radio network temporary identifier, and transmitting the physical downlink control channel in the common search space of the primary component carrier of the user equipment;

or mapping the uplink transmit power control command corresponding to each set of carriers into the corresponding location in the physical downlink control channel using the downlink control information format 3/3A according to the transmit power control-index corresponding to the set of carriers, scrambling the physical downlink control channel with the transmit power control-radio network temporary identifier corresponding to the set of carriers, and transmitting the physical downlink control channel in the common search space of the primary component carrier of the user equipment includes:

mapping uplink transmit power control commands corresponding to sets of carriers with the same transmit power control-radio network temporary identifier of different user equipments into the same physical downlink control channel using the downlink control information format 3/3A and scrambled with the same transmit power control-radio network temporary identifier, and transmitting the physical downlink control channel in the common search space of the primary component carrier of the user equipment.

In connection with the second aspect or any preceding possible implementation of the second aspect, in a third possible implementation, the transmit power control-radio network temporary identifier includes a Transmit Power Control-Physical Uplink Control Channel-Radio Network Temporary Identifier (TPC-PUCCH-RNTI) or a Transmit Power Control-Physical Uplink Shared Channel-Radio Network Temporary Identifier (TPC-PUSCH-RNTI).

In a third aspect, a method for transmitting an uplink power control command includes:

determining transmit power control-radio network temporary identifiers corresponding to respective sets of carriers and transmit power control-indexes corresponding to the respective sets of carriers;

detecting physical downlink control channels using the downlink control information format 3/3A and scrambled with the transmit power control-radio network temporary identifiers corresponding to the respective sets of carriers in common search spaces of search carriers corresponding to the respective sets of carriers respectively, wherein the search carrier corresponding to each set of carriers is such a carrier in the set of carriers that is preconfigured in higher-layer signaling or predefined with the network side; and determining the locations, of uplink transmit power control commands corresponding to the respective sets of carriers, in the physical downlink control channels detected on the search carriers corresponding to the sets of carriers according to the transmit power control-indexes corresponding to the sets of carriers respectively, and obtaining the uplink transmit power control commands corresponding to the sets of carriers at the corresponding locations.

In connection with the third aspect, in a first possible implementation, determining the transmit power control-radio network temporary identifiers corresponding to the respective sets of carriers and the transmit power control-indexes corresponding to the respective sets of carriers includes:

determining a transmit power control-radio network temporary identifier corresponding to the user equipment as indicated by higher-layer signaling or as predefined with the network side, wherein the transmit power control-radio network temporary identifier corresponding to the user equipment is used as the transmit power control-radio network temporary identifier corresponding to each set of carriers of the user equipment; and determining a transmit power control-index corresponding to the user equipment as indicated by higher-layer signaling or as predefined with the network side, wherein the transmit power control-index corresponding to the user equipment is used as the transmit power control-index corresponding to each set of carriers of the user equipment; or determining the transmit power control-indexes corresponding to the respective sets of carriers as indicated by higher-layer signaling or as predefined with the network side; or determining a transmit power control index corresponding to the user equipment, and transmit power control-index-offsets corresponding to the respective sets of carriers as indicated by higher-layer signaling or as predefined with the network side, and determining the transmit power control-indexes corresponding to the respective sets of carriers according to the transmit power control-index corresponding to the user equipment, and the transmit power control-index-offsets corresponding to the respective sets of carriers.

In connection with the third aspect or the first possible implementation of the third aspect, in a second possible implementation, the search carrier corresponding to each set of carriers is:

a downlink carrier, in the set of carriers, paired with an uplink carrier, corresponding to the set of carriers, on which uplink control information is transmitted;

or a downlink primary component carrier in the set of carriers.

In connection with the third aspect or the first possible implementation of the third aspect, in a third possible implementation, the transmit power control-radio network temporary identifier is a transmit power control-physical uplink control channel-radio network temporary identifier; or the transmit power control-radio network temporary identifier is a transmit power control-physical uplink shared channel-radio network temporary identifier.

In a fourth aspect, a method for transmitting an uplink power control command includes:

determining transmit power control-radio network temporary identifiers corresponding to respective sets of carriers of a user equipment and transmit power control-indexes corresponding to the respective sets of carriers of the user equipment; and mapping an uplink transmit power control command corresponding to each set of carriers into a corresponding location in a physical downlink control channel using the downlink control information format 3/3A according to the transmit power control-index of the set of carriers, scrambling the physical downlink control channel with the transmit power control-radio network temporary identifier corresponding to the set of carriers, and transmitting the physical downlink control channel in a common search space of a search carrier corresponding to the set of carriers of the user equipment, wherein the search carrier corresponding to each set of carriers is such a carrier in the set of carriers that is preconfigured in higher-layer signaling or predefined with the user equipment.

In connection with the fourth aspect, in a first possible implementation, determining the transmit power control-radio network temporary identifiers corresponding to the respective sets of carriers of the user equipment and the transmit power control-indexes corresponding to the respective sets of carriers of the user equipment includes:

determining a transmit power control-radio network temporary identifier corresponding to the user equipment as predefined with the user equipment, or determining a transmit power control-radio network temporary identifier corresponding to the user equipment, and configuring the user equipment with the transmit power control-radio network temporary identifier in higher-layer signaling, wherein the transmit power control-radio network temporary identifier corresponding to the user equipment is used as the transmit power control-radio network temporary identifier corresponding to each set of carriers of the user equipment; and determining a transmit power control-index corresponding to the user equipment as predefined with the user equipment, or determining a transmit power control-index corresponding to the user equipment, and configuring the user equipment with the transmit power control-index in higher-layer signaling, wherein the transmit power control-index corresponding to the user equipment is used as the transmit power control-index corresponding to each set of carriers of the user equipment; or determining the transmit power control-indexes corresponding to the respective sets of carriers as predefined with the user equipment, or determining the transmit power control-indexes corresponding to the respective sets of carriers, and configuring the user equipment with the transmit power control-indexes in higher-layer signaling; or firstly determining a transmit power control index corresponding to the user equipment, and transmit power control-index-offsets corresponding to the respective sets of carriers as predefined with the user equipment, or determining a transmit power control index corresponding to the user equipment, and transmit power control-index-offsets corresponding to the respective sets of carriers, and configuring the user equipment with the transmit power control index and the transmit power control-index-offsets in higher-layer signaling; and then determining the transmit power control-indexes corresponding to the respective sets of carriers according to the transmit power control-index corresponding to the user equipment, and the transmit power control-index-offsets corresponding to the respective sets of carriers.

In connection with the fourth aspect or the first possible implementation of the fourth aspect, in a second possible implementation, the method further includes:

for each set of carriers, mapping uplink transmit power control commands of multiple user equipments with the same transmit power control-radio network temporary identifier in the set of carriers, into the same physical downlink control channel using the downlink control information format 3/3A and scrambled with the said same transmit power control-radio network temporary identifier, and transmitting the physical downlink control channel in the common search space of the search carrier corresponding to the set of carriers.

In connection with the fourth aspect or the first possible implementation of the fourth aspect, in a third possible implementation, the search carrier corresponding to each set of carriers is:

a downlink carrier, in the set of carriers, paired with an uplink carrier, corresponding to the set of carriers, on which uplink control information is transmitted;

or a downlink primary component carrier in the set of carriers.

In connection with the fourth aspect or the first possible implementation of the fourth aspect, in a fourth possible implementation, the transmit power control-radio network temporary identifier is a transmit power control-physical uplink control channel-radio network temporary identifier; or the transmit power control-radio network temporary identifier is a transmit power control-physical uplink shared channel-radio network temporary identifier.

In a fifth aspect, a user equipment includes:

a first parameter determining module configured to determine transmit power control-radio network temporary identifiers corresponding to respective sets of carriers and transmit power control-indexes corresponding to the respective sets of carriers;

a first channel searching module configured to detect physical downlink control channels using the downlink control information format 3/3A and scrambled with the transmit power control-radio network temporary identifiers corresponding to the respective sets of carriers in a common search space of a primary component carrier; and a first power control command obtaining module configured to determine the locations, of uplink transmit power control commands corresponding to the respective sets of carriers, in the detected physical downlink control channels scrambled with the transmit power control-radio network temporary identifiers corresponding to the sets of carriers according to the transmit power control-indexes corresponding to the sets of carriers, and to obtain the uplink transmit power control commands corresponding to the sets of carriers at the corresponding locations.

In connection with the fifth aspect, in a first possible implementation, the first parameter determining module is configured to determine the transmit power control-radio network temporary identifiers corresponding to the respective sets of carriers and the transmit power control-indexes corresponding to the respective sets of carriers in any one of the following approaches:

a first approach where:

the first parameter determining module is configured to determine a transmit power control-radio network temporary identifier corresponding to the user equipment as indicated by higher-layer signaling or as predefined with the network side, wherein the transmit power control-radio network temporary identifier corresponding to the user equipment is used as the transmit power control-radio network temporary identifier corresponding to each set of carriers of the user equipment; and to determine the transmit power control-indexes corresponding to the respective sets of carriers as indicated by higher-layer signaling or as predefined with the network side, wherein transmit power control-indexes corresponding to different sets of carriers are different from each other; or to determine a transmit power control-index corresponding to the user equipment, and transmit power control-index-offsets corresponding to the respective sets of carriers as indicated by higher-layer signaling or as predefined with the network side, and to determine the transmit power control-indexes corresponding to the respective sets of carriers according to the transmit power control-index corresponding to the user equipment, and the transmit power control-index-offsets corresponding to the respective sets of carriers, wherein transmit power control-indexes corresponding to different sets of carriers are different from each other;

a second approach where:

the first parameter determining module is configured to determine the transmit power control-radio network temporary identifiers corresponding to the respective sets of carriers as indicated by higher-layer signaling or as predefined with the network side, wherein transmit power control-radio network temporary identifiers corresponding to different sets of carriers are different from each other; and to determine a transmit power control-index corresponding to the user equipment as indicated by higher-layer signaling or as predefined with the network side, wherein the transmit power control-index corresponding to the user equipment is a transmit power control-index corresponding to each set of carriers of the user equipment; or to determine the transmit power control-indexes corresponding to the respective sets of carriers as indicated by higher-layer signaling or as predefined with the network side; or to determine a transmit power control-index corresponding to the user equipment, and transmit power control-index-offsets corresponding to the respective sets of carriers as indicated by higher-layer signaling or as predefined with the network side, and to determine the transmit power control-indexes corresponding to the respective sets of carriers according to the transmit power control-index corresponding to the user equipment, and the transmit power control-index-offsets corresponding to the respective sets of carriers; and a third approach where:

the first parameter determining module is configured to determine the transmit power control-radio network temporary identifiers corresponding to the respective sets of carriers as indicated by higher-layer signaling or as predefined with the network side, wherein not all of transmit power control-radio network temporary identifiers corresponding to different sets of carriers are the same; and to determine the transmit power control-indexes corresponding to the respective sets of carriers as indicated by higher-layer signaling or as predefined with the network side, wherein sets of carriers corresponding to the same transmit power control-radio network temporary identifier correspond to different transmit power control-indexes; or to determine a transmit power control-index corresponding to the user equipment, and transmit power control-index-offsets corresponding to the respective sets of carriers as indicated by higher-layer signaling or as predefined with the network side, and to determine the transmit power control-indexes corresponding to the respective sets of carriers according to the transmit power control-index corresponding to the user equipment, and the transmit power control-index-offsets corresponding to the respective sets of carriers, wherein sets of carriers corresponding to the same transmit power control-radio network temporary identifier correspond to different transmit power control-indexes.

In connection with the first possible implementation of the fifth aspect, in a second possible implementation, in the first approach or the third approach, the first power control command obtaining module is configured:

when a plurality of sets of carriers of the user equipment correspond to the same transmit power control-radio network temporary identifier, to determine the locations, of the uplink transmit power control commands corresponding to the respective sets of carriers, in the detected physical downlink control channel scrambled with the transmit power control-radio network temporary identifier according to the transmit power control-indexes corresponding to the respective sets of carriers with the same transmit power control-radio network temporary identifier respectively, and to obtain the uplink transmit power control commands corresponding to the respective sets of carriers at the corresponding locations.

In connection with the fifth aspect or any preceding possible implementation of the fifth aspect, in a third possible implementation, the transmit power control-radio network temporary identifier includes a transmit power control-physical uplink control channel-radio network temporary identifier or a transmit power control-physical uplink shared channel-radio network temporary identifier.

In a sixth aspect, a network-side device includes:

a third parameter determining module configured to determine transmit power control-radio network temporary identifiers corresponding to respective sets of carriers of a user equipment and transmit power control-indexes corresponding to the respective sets of carriers of the user equipment; and a third power control command transmitting module configured to map an uplink transmit power control command corresponding to each set of carriers into a corresponding location in a physical downlink control channel using the downlink control information format 3/3A according to the transmit power control-index corresponding to the set of carriers, to scramble the physical downlink control channel with the transmit power control-radio network temporary identifier corresponding to the set of carriers, and to transmit the physical downlink control channel in a common search space of a primary component carrier of the user equipment.

In connection with the sixth aspect, in a first possible implementation, the third parameter determining module is configured to determine the transmit power control-radio network temporary identifiers corresponding to the respective sets of carriers of the user equipment and the transmit power control-indexes corresponding to the respective sets of carriers of the user equipment in any one of the following approaches:

a first approach where:

the third parameter determining module is configured to determine a transmit power control-radio network temporary identifier corresponding to the user equipment as predefined with the user equipment, or to determine a transmit power control-radio network temporary identifier corresponding to the user equipment, and to configure the user equipment with the transmit power control-radio network temporary identifier in higher-layer signaling, wherein the transmit power control-radio network temporary identifier corresponding to the user equipment is used as the transmit power control-radio network temporary identifier corresponding to each set of carriers of the user equipment; and to determine the transmit power control-indexes corresponding to the respective sets of carriers of the user equipment as predefined with the user equipment, or to determine the transmit power control-indexes corresponding to the respective sets of carriers of the user equipment, and to configure the user equipment with the transmit power control-indexes in higher-layer signaling, wherein transmit power control-indexes corresponding to different sets of carriers are different from each other; or firstly to determine a transmit power control-index corresponding to the user equipment, and transmit power control-index-offsets corresponding to the respective sets of carriers of the user equipment as predefined with the user equipment; or to determine a transmit power control-index corresponding to the user equipment, and transmit power control-index-offsets corresponding to the respective sets of carriers of the user equipment, and to configure the user equipment with the transmit power control-index and the transmit power control-index-offsets in higher-layer signaling; and step 2: to determine the transmit power control-indexes corresponding to the respective sets of carriers of the user equipment according to the transmit power control-index corresponding to the user equipment, and the transmit power control-index-offsets corresponding to the respective sets of carriers of the user equipment, wherein transmit power control-indexes corresponding to different sets of carriers are different from each other;

a second approach where:

the third parameter determining module is configured to determine the transmit power control-radio network temporary identifiers corresponding to the respective sets of carriers of the user equipment as predefined with the user equipment, or to determine the transmit power control-radio network temporary identifiers corresponding to the respective sets of carriers of the user equipment, and to configure the user equipment with the transmit power control-radio network temporary identifiers in higher-layer signaling, wherein transmit power control-radio network temporary identifiers corresponding to different sets of carriers are different from each other; and to determine a transmit power control-index corresponding to the user equipment as predefined with the user equipment, or to determine a transmit power control-index corresponding to the user equipment, and to configure the user equipment with the transmit power control-index in higher-layer signaling, wherein the transmit power control-index corresponding to the user equipment is used as the transmit power control-index corresponding to each set of carriers of the user equipment; or to determine the transmit power control-indexes corresponding to the respective sets of carriers of the user equipment as predefined with the user equipment, or to determine the transmit power control-indexes corresponding to the respective sets of carriers of the user equipment, and to configure the user equipment with the transmit power control-indexes in higher-layer signaling; or firstly to determine a transmit power control-index corresponding to the user equipment, and transmit power control-index-offsets corresponding to the respective sets of carriers of the user equipment as predefined with the user equipment, or to determine a transmit power control-index corresponding to the user equipment, and transmit power control-index-offsets corresponding to the respective sets of carriers of the user equipment, and to configure the user equipment with the transmit power control-index and the transmit power control-index-offsets in higher-layer signaling; and then to determine the transmit power control-indexes corresponding to the respective sets of carriers of the user equipment according to the transmit power control-index corresponding to the user equipment, and the transmit power control-index-offsets corresponding to the respective sets of carriers; and a third approach where:

the third parameter determining module is configured to determine the transmit power control-radio network temporary identifiers corresponding to the respective sets of carriers of the user equipment as predefined with the user equipment, or to determine the transmit power control-radio network temporary identifiers corresponding to the respective sets of carriers of the user equipment, and to configure the user equipment with the transmit power control-radio network temporary identifiers in higher-layer signaling, wherein not all of the transmit power control-radio network temporary identifiers corresponding to the respective sets of carriers are the same; and to determine the transmit power control-indexes corresponding to the respective sets of carriers of the user equipment as predefined with the user equipment, or to determine the transmit power control-indexes corresponding to the respective sets of carriers of the user equipment, and to configure the user equipment with the transmit power control-indexes in higher-layer signaling, wherein transmit power control-indexes corresponding to sets of carriers corresponding to the same transmit power control-radio network temporary identifier are different from each other; or firstly to determine a transmit power control-index corresponding to the user equipment, and transmit power control-index-offsets corresponding to the respective sets of carriers of the user equipment as predefined with the user equipment, or to determine a transmit power control-index corresponding to the user equipment, and transmit power control-index-offsets corresponding to the respective sets of carriers of the user equipment, and to configure the user equipment with the transmit power control-index and the transmit power control-index-offsets in higher-layer signaling; and then to determine the transmit power control-indexes corresponding to the respective sets of carriers of the user equipment according to the transmit power control-index corresponding to the user equipment, and the transmit power control-index-offsets corresponding to the respective sets of carriers of the user equipment, wherein transmit power control-indexes corresponding to sets of carriers corresponding to the same transmit power control-radio network temporary identifier are different from each other.

In connection with the first possible implementation of the sixth aspect, in a second possible implementation, in the second approach or the third approach, the third power control command transmitting module is configured:

to map the uplink transmit power control commands corresponding to the sets of carriers of the user equipment corresponding to different transmit power control-radio network temporary identifiers into multiple physical downlink control channels using the downlink control information format 3/3A and scrambled with the corresponding different transmit power control-radio network temporary identifiers respectively, and to transmit the plurality of physical downlink control channels in the common search space of the primary component carrier of the user equipment respectively in different downlink sub-frames;

or in the first approach or the third approach, the third power control command transmitting module is configured:

to map the uplink transmit power control commands corresponding to the sets of carriers of the user equipment with the same transmit power control-radio network temporary identifier into the same physical downlink control channel using the downlink control information format 3/3A and scrambled with the same transmit power control-radio network temporary identifier, and to transmit the physical downlink control channel in the common search space of the primary component carrier of the user equipment;

or the third power control command transmitting module is configured to map uplink transmit power control commands corresponding to sets of carriers with the same transmit power control-radio network temporary identifier of different user equipments into the same physical downlink control channel using the downlink control information format 3/3A and scrambled with the same transmit power control-radio network temporary identifier, and to transmit the physical downlink control channel in the common search space of the primary component carrier of the user equipment.

In connection with the sixth aspect or any preceding possible implementation of the sixth aspect, in a third possible implementation, the transmit power control-radio network temporary identifier includes a transmit power control-physical uplink control channel-radio network temporary identifier or a transmit power control-physical uplink shared channel-radio network temporary identifier.

In a seventh aspect, a user equipment includes:

a second parameter determining module configured to determine transmit power control-radio network temporary identifiers corresponding to respective sets of carriers and transmit power control-indexes corresponding to the respective sets of carriers;

a second channel searching module configured to detect physical downlink control channels using the downlink control information format 3/3A and scrambled with the transmit power control-radio network temporary identifiers corresponding to the respective sets of carriers in common search spaces of search carriers corresponding to the respective sets of carriers respectively, wherein the search carrier corresponding to each set of carriers is such a carrier in the set of carriers that is preconfigured in higher-layer signaling or predefined with the network side; and a second power control command obtaining module configured to determine the locations, of uplink transmit power control commands corresponding to the respective sets of carriers, in the physical downlink control channels detected on the search carriers corresponding to the sets of carriers according to the transmit power control-indexes corresponding to the sets of carriers respectively, and to obtain the uplink transmit power control commands corresponding to the sets of carriers at the corresponding locations.

In connection with the seventh aspect, in a first possible implementation, the second parameter determining module configured to determine the transmit power control-radio network temporary identifiers corresponding to the respective sets of carriers and the transmit power control-indexes corresponding to the respective sets of carriers is configured:

to determine a transmit power control-radio network temporary identifier corresponding to the user equipment as indicated by higher-layer signaling or as predefined with the network side, wherein the transmit power control-radio network temporary identifier corresponding to the user equipment is used as the transmit power control-radio network temporary identifier corresponding to each set of carriers of the user equipment; and to determine a transmit power control-index corresponding to the user equipment as indicated by higher-layer signaling or as predefined with the network side, wherein the transmit power control-index corresponding to the user equipment is used as the transmit power control-index corresponding to each set of carriers of the user equipment; or to determine the transmit power control-indexes corresponding to the respective sets of carriers as indicated by higher-layer signaling or as predefined with the network side; or to determine a transmit power control index corresponding to the user equipment, and transmit power control-index-offsets corresponding to the respective sets of carriers as indicated by higher-layer signaling or as predefined with the network side, and to determine the transmit power control-indexes corresponding to the respective sets of carriers according to the transmit power control-index corresponding to the user equipment, and the transmit power control-index-offsets corresponding to the respective sets of carriers.

In connection with the seventh aspect or the first possible implementation of the seventh aspect, in a second possible implementation, the search carrier corresponding to each set of carriers is:

a downlink carrier, in the set of carriers, paired with an uplink carrier, corresponding to the set of carriers, on which uplink control information is transmitted;

or a downlink primary component carrier in the set of carriers.

In connection with the seventh aspect or the first possible implementation of the seventh aspect, in a third possible implementation, the transmit power control-radio network temporary identifier is a transmit power control-physical uplink control channel-radio network temporary identifier; or the transmit power control-radio network temporary identifier is a transmit power control-physical uplink shared channel-radio network temporary identifier.

In an eighth aspect, a network-side device includes:

a fourth parameter determining module configured to determine transmit power control-radio network temporary identifiers corresponding to respective sets of carriers of a user equipment and transmit power control-indexes corresponding to the respective sets of carriers of the user equipment; and a fourth power control command transmitting module configured to map an uplink transmit power control command corresponding to each set of carriers into a corresponding location in a physical downlink control channel using the downlink control information format 3/3A according to the transmit power control-index of the set of carriers, to scramble the physical downlink control channel with the transmit power control-radio network temporary identifier corresponding to the set of carriers, and to transmit the physical downlink control channel in a common search space of a search carrier corresponding to the set of carriers of the user equipment, wherein the search carrier corresponding to each set of carriers is such a carrier in the set of carriers that is preconfigured in higher-layer signaling or predefined with the user equipment.

In connection with the eighth aspect, in a first possible implementation, the fourth parameter determining module configured to determine the transmit power control-radio network temporary identifiers corresponding to the respective sets of carriers of the user equipment and the transmit power control-indexes corresponding to the respective sets of carriers of the user equipment is configured:

to determine a transmit power control-radio network temporary identifier corresponding to the user equipment as predefined with the user equipment, or to determine a transmit power control-radio network temporary identifier corresponding to the user equipment, and to configure the user equipment with the transmit power control-radio network temporary identifier in higher-layer signaling, wherein the transmit power control-radio network temporary identifier corresponding to the user equipment is used as the transmit power control-radio network temporary identifier corresponding to each set of carriers of the user equipment; and to determine a transmit power control-index corresponding to the user equipment as predefined with the user equipment, or to determine a transmit power control-index corresponding to the user equipment, and to configure the user equipment with the transmit power control-index in higher-layer signaling, wherein the transmit power control-index corresponding to the user equipment is used as the transmit power control-index corresponding to each set of carriers of the user equipment; or to determine the transmit power control-indexes corresponding to the respective sets of carriers as predefined with the user equipment, or to determine the transmit power control-indexes corresponding to the respective sets of carriers, and to configure the user equipment with the transmit power control-indexes in higher-layer signaling; or firstly to determine a transmit power control index corresponding to the user equipment, and transmit power control-index-offsets corresponding to the respective sets of carriers as predefined with the user equipment, or to determine a transmit power control index corresponding to the user equipment, and transmit power control-index-offsets corresponding to the respective sets of carriers, and to configure the user equipment with the transmit power control index and the transmit power control-index-offsets in higher-layer signaling; and then to determine the transmit power control-indexes corresponding to the respective sets of carriers according to the transmit power control-index corresponding to the user equipment, and the transmit power control-index-offsets corresponding to the respective sets of carriers.

In connection with the eighth aspect or the first possible implementation of the eighth aspect, in a second possible implementation, the fourth power control command transmitting module is further configured:

for each set of carriers, to map uplink transmit power control commands of multiple user equipments with the same transmit power control-radio network temporary identifier in the set of carriers, into the same physical downlink control channel using the downlink control information format 3/3A and scrambled with the said same transmit power control-radio network temporary identifier, and to transmit the physical downlink control channel in the common search space of the search carrier corresponding to the set of carriers.

In connection with the eighth aspect or the first possible implementation of the eighth aspect, in a third possible implementation, the search carrier corresponding to each set of carriers is:

a downlink carrier, in the set of carriers, paired with an uplink carrier, corresponding to the set of carriers, on which uplink control information is transmitted;

or a downlink primary component carrier in the set of carriers.

In connection with the eighth aspect or the first possible implementation of the eighth aspect, in a fourth possible implementation, the transmit power control-radio network temporary identifier is a transmit power control-physical uplink control channel-radio network temporary identifier; or the transmit power control-radio network temporary identifier is a transmit power control-physical uplink shared channel-radio network temporary identifier.

In a ninth aspect, a user equipment includes:

a first processor configured to determine transmit power control-radio network temporary identifiers corresponding to respective sets of carriers and transmit power control-indexes corresponding to the respective sets of carriers; to detect physical downlink control channels using the downlink control information format 3/3A and scrambled with the transmit power control-radio network temporary identifiers corresponding to the respective sets of carriers in a common search space of a primary component carrier; and to determine the locations, of uplink transmit power control commands corresponding to the respective sets of carriers, in the detected physical downlink control channels scrambled with the transmit power control-radio network temporary identifiers corresponding to the sets of carriers according to the transmit power control-indexes corresponding to the sets of carriers, and to obtain the uplink transmit power control commands corresponding to the respective sets of carriers at the corresponding locations.

In connection with the ninth aspect, in a first possible implementation, the first processor is configured to determine the transmit power control-radio network temporary identifiers corresponding to the respective sets of carriers and the transmit power control-indexes corresponding to the respective sets of carriers in any one of the following approaches:

a first approach where:

the first processor is configured to determine a transmit power control-radio network temporary identifier corresponding to the user equipment as indicated by higher-layer signaling or as predefined with the network side, wherein the transmit power control-radio network temporary identifier corresponding to the user equipment is used as the transmit power control-radio network temporary identifier corresponding to each set of carriers of the user equipment; and to determine the transmit power control-indexes corresponding to the respective sets of carriers as indicated by higher-layer signaling or as predefined with the network side, wherein transmit power control-indexes corresponding to different sets of carriers are different from each other; or to determine a transmit power control-index corresponding to the user equipment, and transmit power control-index-offsets corresponding to the respective sets of carriers as indicated by higher-layer signaling or as predefined with the network side, and to determine the transmit power control-indexes corresponding to the respective sets of carriers according to the transmit power control-index corresponding to the user equipment, and the transmit power control-index-offsets corresponding to the respective sets of carriers, wherein transmit power control-indexes corresponding to different sets of carriers are different from each other;

a second approach where:

the first processor is configured to determine the transmit power control-radio network temporary identifiers corresponding to the respective sets of carriers as indicated by higher-layer signaling or as predefined with the network side, wherein transmit power control-radio network temporary identifiers corresponding to different sets of carriers are different from each other; and to determine a transmit power control-index corresponding to the user equipment as indicated by higher-layer signaling or as predefined with the network side, wherein the transmit power control-index corresponding to the user equipment is a transmit power control-index corresponding to each set of carriers of the user equipment; or to determine the transmit power control-indexes corresponding to the respective sets of carriers as indicated by higher-layer signaling or as predefined with the network side; or to determine a transmit power control-index corresponding to the user equipment, and transmit power control-index-offsets corresponding to the respective sets of carriers as indicated by higher-layer signaling or as predefined with the network side, and to determine the transmit power control-indexes corresponding to the respective sets of carriers according to the transmit power control-index corresponding to the user equipment, and the transmit power control-index-offsets corresponding to the respective sets of carriers;

a third approach where:

the first processor is configured to determine the transmit power control-radio network temporary identifiers corresponding to the respective sets of carriers as indicated by higher-layer signaling or as predefined with the network side, wherein not all of transmit power control-radio network temporary identifiers corresponding to different sets of carriers are the same; and to determine the transmit power control-indexes corresponding to the respective sets of carriers as indicated by higher-layer signaling or as predefined with the network side, wherein sets of carriers corresponding to the same transmit power control-radio network temporary identifier correspond to different transmit power control-indexes; or to determine a transmit power control-index corresponding to the user equipment, and transmit power control-index-offsets corresponding to the respective sets of carriers as indicated by higher-layer signaling or as predefined with the network side, and to determine the transmit power control-indexes corresponding to the respective sets of carriers according to the transmit power control-index corresponding to the user equipment, and the transmit power control-index-offsets corresponding to the respective sets of carriers, wherein sets of carriers corresponding to the same transmit power control-radio network temporary identifier correspond to different transmit power control-indexes.

In connection with the first possible implementation of the ninth aspect, in a second possible implementation, in the first approach or the third approach, the first processor is configured:

when a plurality of sets of carriers of the user equipment correspond to the same transmit power control-radio network temporary identifier, to determine the locations, of the uplink transmit power control commands corresponding to the respective sets of carriers, in the detected physical downlink control channel scrambled with the transmit power control-radio network temporary identifier according to the transmit power control-indexes corresponding to the respective sets of carriers with the same transmit power control-radio network temporary identifier respectively, and to obtain the uplink transmit power control commands corresponding to the respective sets of carriers at the corresponding locations.

In connection with the ninth aspect or any preceding possible implementation of the ninth aspect, in a third possible implementation, the transmit power control-radio network temporary identifier includes a transmit power control-physical uplink control channel-radio network temporary identifier or a transmit power control-physical uplink shared channel-radio network temporary identifier.

In a tenth aspect, a network-side device includes:

a third processor configured to determine transmit power control-radio network temporary identifiers corresponding to respective sets of carriers of a user equipment and transmit power control-indexes corresponding to the respective sets of carriers of the user equipment; and a third communication port configured to map an uplink transmit power control command corresponding to each set of carriers into a corresponding location in a physical downlink control channel using the downlink control information format 3/3A according to the transmit power control-index corresponding to the set of carriers, to scramble the physical downlink control channel with the transmit power control-radio network temporary identifier corresponding to the set of carriers, and to transmit the physical downlink control channel in a common search space of a primary component carrier of the user equipment.

In connection with the tenth aspect, in a first possible implementation, the third processor is configured to determine the transmit power control-radio network temporary identifiers corresponding to the respective sets of carriers of the user equipment and the transmit power control-indexes corresponding to the respective sets of carriers of the user equipment in any one of the following approaches:

a first approach where:

the third processor is configured to determine a transmit power control-radio network temporary identifier corresponding to the user equipment as predefined with the user equipment, or to determine a transmit power control-radio network temporary identifier corresponding to the user equipment, and to configure the user equipment with the transmit power control-radio network temporary identifier in higher-layer signaling, wherein the transmit power control-radio network temporary identifier corresponding to the user equipment is used as the transmit power control-radio network temporary identifier corresponding to each set of carriers of the user equipment; and to determine the transmit power control-indexes corresponding to the respective sets of carriers of the user equipment as predefined with the user equipment, or to determine the transmit power control-indexes corresponding to the respective sets of carriers of the user equipment, and to configure the user equipment with the transmit power control-indexes in higher-layer signaling, wherein transmit power control-indexes corresponding to different sets of carriers are different from each other; or firstly to determine a transmit power control-index corresponding to the user equipment, and transmit power control-index-offsets corresponding to the respective sets of carriers of the user equipment as predefined with the user equipment, or to determine a transmit power control-index corresponding to the user equipment, and transmit power control-index-offsets corresponding to the respective sets of carriers of the user equipment, and to configure the user equipment with the transmit power control-index and the transmit power control-index-offsets in higher-layer signaling; and step 2: to determine the transmit power control-indexes corresponding to the respective sets of carriers of the user equipment according to the transmit power control-index corresponding to the user equipment, and the transmit power control-index-offsets corresponding to the respective sets of carriers of the user equipment, wherein transmit power control-indexes corresponding to different sets of carriers are different from each other;

a second approach where:

the third processor is configured to determine the transmit power control-radio network temporary identifiers corresponding to the respective sets of carriers of the user equipment as predefined with the user equipment, or to determine the transmit power control-radio network temporary identifiers corresponding to the respective sets of carriers of the user equipment, and to configure the user equipment with the transmit power control-radio network temporary identifiers in higher-layer signaling, wherein transmit power control-radio network temporary identifiers corresponding to different sets of carriers are different from each other; and to determine a transmit power control-index corresponding to the user equipment as predefined with the user equipment, or to determine a transmit power control-index corresponding to the user equipment, and to configure the user equipment with the transmit power control-index in higher-layer signaling, wherein the transmit power control-index corresponding to the user equipment is used as the transmit power control-index corresponding to each set of carriers of the user equipment; or to determine the transmit power control-indexes corresponding to the respective sets of carriers of the user equipment as predefined with the user equipment, or to determine the transmit power control-indexes corresponding to the respective sets of carriers of the user equipment, and to configure the user equipment with the transmit power control-indexes in higher-layer signaling; or firstly to determine a transmit power control-index corresponding to the user equipment, and transmit power control-index-offsets corresponding to the respective sets of carriers of the user equipment as predefined with the user equipment, or to determine a transmit power control-index corresponding to the user equipment, and transmit power control-index-offsets corresponding to the respective sets of carriers of the user equipment, and to configure the user equipment with the transmit power control-index and the transmit power control-index-offsets in higher-layer signaling; and then to determine the transmit power control-indexes corresponding to the respective sets of carriers of the user equipment according to the transmit power control-index corresponding to the user equipment, and the transmit power control-index-offsets corresponding to the respective sets of carriers; and a third approach where:

the third processor is configured to determine the transmit power control-radio network temporary identifiers corresponding to the respective sets of carriers of the user equipment as predefined with the user equipment, or to determine the transmit power control-radio network temporary identifiers corresponding to the respective sets of carriers of the user equipment, and to configure the user equipment with the transmit power control-radio network temporary identifiers in higher-layer signaling, wherein not all of the transmit power control-radio network temporary identifiers corresponding to the respective sets of carriers are the same; and to determine the transmit power control-indexes corresponding to the respective sets of carriers of the user equipment as predefined with the user equipment, or to determine the transmit power control-indexes corresponding to the respective sets of carriers of the user equipment, and to configure the user equipment with the transmit power control-indexes in higher-layer signaling, wherein transmit power control-indexes corresponding to sets of carriers corresponding to the same transmit power control-radio network temporary identifier are different from each other; or firstly to determine a transmit power control-index corresponding to the user equipment, and transmit power control-index-offsets corresponding to the respective sets of carriers of the user equipment as predefined with the user equipment, or to determine a transmit power control-index corresponding to the user equipment, and transmit power control-index-offsets corresponding to the respective sets of carriers of the user equipment, and to configure the user equipment with the transmit power control-index and the transmit power control-index-offsets in higher-layer signaling; and then to determine the transmit power control-indexes corresponding to the respective sets of carriers of the user equipment according to the transmit power control-index corresponding to the user equipment, and the transmit power control-index-offsets corresponding to the respective sets of carriers of the user equipment, wherein transmit power control-indexes corresponding to sets of carriers corresponding to the same transmit power control-radio network temporary identifier are different from each other.

In connection with the first possible implementation of the tenth aspect, in a second possible implementation, in the second approach or the third approach, the third communication port is configured:

to map the uplink transmit power control commands corresponding to the sets of carriers of the user equipment corresponding to different transmit power control-radio network temporary identifiers into multiple physical downlink control channels using the downlink control information format 3/3A and scrambled with the corresponding different transmit power control-radio network temporary identifiers respectively, and to transmit the plurality of physical downlink control channels in the common search space of the primary component carrier of the user equipment respectively in different downlink sub-frames;

or in the first approach or the third approach, the third communication port is configured:

to map the uplink transmit power control commands corresponding to the sets of carriers of the user equipment with the same transmit power control-radio network temporary identifier into the same physical downlink control channel using the downlink control information format 3/3A and scrambled with the same transmit power control-radio network temporary identifier, and to transmit the physical downlink control channel in the common search space of the primary component carrier of the user equipment;

or the third communication port is configured to map uplink transmit power control commands corresponding to sets of carriers with the same transmit power control-radio network temporary identifier of different user equipments into the same physical downlink control channel using the downlink control information format 3/3A and scrambled with the same transmit power control-radio network temporary identifier, and to transmit the physical downlink control channel in the common search space of the primary component carrier of the user equipment.

In connection with the tenth aspect or any preceding possible implementation of the tenth aspect, in a third possible implementation, the transmit power control-radio network temporary identifier includes a transmit power control-physical uplink control channel-radio network temporary identifier or a transmit power control-physical uplink shared channel-radio network temporary identifier.

In an eleventh aspect, a user equipment includes:

a second processor configured to determine transmit power control-radio network temporary identifiers corresponding to respective sets of carriers and transmit power control-indexes corresponding to the respective sets of carriers; to detect physical downlink control channels using the downlink control information format 3/3A and scrambled with the transmit power control-radio network temporary identifiers corresponding to the respective sets of carriers in common search spaces of search carriers corresponding to the respective sets of carriers respectively, wherein the search carrier corresponding to each set of carriers is such a carrier in the set of carriers that is preconfigured in higher-layer signaling or predefined with the network side; and to determine the locations, of uplink transmit power control commands corresponding to the respective sets of carriers, in the physical downlink control channels detected on the search carriers corresponding to the sets of carriers according to the transmit power control-indexes corresponding to the sets of carriers respectively, and to obtain the uplink transmit power control commands corresponding to the sets of carriers at the corresponding locations.

In connection with the eleventh aspect, in a first possible implementation, the second processor configured to determine the transmit power control-radio network temporary identifiers corresponding to the respective sets of carriers and the transmit power control-indexes corresponding to the respective sets of carriers is configured:

to determine a transmit power control-radio network temporary identifier corresponding to the user equipment as indicated by higher-layer signaling or as predefined with the network side, wherein the transmit power control-radio network temporary identifier corresponding to the user equipment is used as the transmit power control-radio network temporary identifier corresponding to each set of carriers of the user equipment; and to determine a transmit power control-index corresponding to the user equipment as indicated by higher-layer signaling or as predefined with the network side, wherein the transmit power control-index corresponding to the user equipment is used as the transmit power control-index corresponding to each set of carriers of the user equipment; or to determine the transmit power control-indexes corresponding to the respective sets of carriers as indicated by higher-layer signaling or as predefined with the network side; or to determine a transmit power control index corresponding to the user equipment, and transmit power control-index-offsets corresponding to the respective sets of carriers as indicated by higher-layer signaling or as predefined with the network side, and to determine the transmit power control-indexes corresponding to the respective sets of carriers according to the transmit power control-index corresponding to the user equipment, and the transmit power control-index-offsets corresponding to the respective sets of carriers.

In connection with the eleventh aspect or the first possible implementation of the eleventh aspect, in a second possible implementation, the search carrier corresponding to each set of carriers is:

a downlink carrier, in the set of carriers, paired with an uplink carrier, corresponding to the set of carriers, on which uplink control information is transmitted;

or a downlink primary component carrier in the set of carriers.

In connection with the eleventh aspect or the first possible implementation of the eleventh aspect, in a third possible implementation, the transmit power control-radio network temporary identifier is a transmit power control-physical uplink control channel-radio network temporary identifier; or the transmit power control-radio network temporary identifier is a transmit power control-physical uplink shared channel-radio network temporary identifier.

In a twelfth aspect, a network-side device includes:

a fourth processor configured to determine transmit power control-radio network temporary identifiers corresponding to respective sets of carriers of a user equipment and transmit power control-indexes corresponding to the respective sets of carriers of the user equipment; and a fourth communication port configured to map an uplink transmit power control command corresponding to each set of carriers into a corresponding location in a physical downlink control channel using the downlink control information format 3/3A according to the transmit power control-index of the set of carriers, to scramble the physical downlink control channel with the transmit power control-radio network temporary identifier corresponding to the set of carriers, and to transmit the physical downlink control channel in a common search space of a search carrier corresponding to the set of carriers of the user equipment, wherein the search carrier corresponding to each set of carriers is such a carrier in the set of carriers that is preconfigured in higher-layer signaling or predefined with the user equipment.

In connection with the twelfth aspect, in a first possible implementation, the fourth processor configured to determine the transmit power control-radio network temporary identifiers corresponding to the respective sets of carriers of the user equipment and the transmit power control-indexes corresponding to the respective sets of carriers of the user equipment is configured:

to determine a transmit power control-radio network temporary identifier corresponding to the user equipment as predefined with the user equipment, or to determine a transmit power control-radio network temporary identifier corresponding to the user equipment, and to configure the user equipment with the transmit power control-radio network temporary identifier in higher-layer signaling, wherein the transmit power control-radio network temporary identifier corresponding to the user equipment is used as the transmit power control-radio network temporary identifier corresponding to each set of carriers of the user equipment; and to determine a transmit power control-index corresponding to the user equipment as predefined with the user equipment, or to determine a transmit power control-index corresponding to the user equipment, and to configure the user equipment with the transmit power control-index in higher-layer signaling, wherein the transmit power control-index corresponding to the user equipment is used as the transmit power control-index corresponding to each set of carriers of the user equipment; or to determine the transmit power control-indexes corresponding to the respective sets of carriers as predefined with the user equipment, or to determine the transmit power control-indexes corresponding to the respective sets of carriers, and to configure the user equipment with the transmit power control-indexes in higher-layer signaling; or firstly to determine a transmit power control index corresponding to the user equipment, and transmit power control-index-offsets corresponding to the respective sets of carriers as predefined with the user equipment, or to determine a transmit power control index corresponding to the user equipment, and transmit power control-index-offsets corresponding to the respective sets of carriers, and to configure the user equipment with the transmit power control index and the transmit power control-index-offsets in higher-layer signaling; and then to determine the transmit power control-indexes corresponding to the respective sets of carriers according to the transmit power control-index corresponding to the user equipment, and the transmit power control-index-offsets corresponding to the respective sets of carriers.

In connection with the twelfth aspect or the first possible implementation of the twelfth aspect, in a second possible implementation, the fourth communication port is further configured:

for each set of carriers, to map uplink transmit power control commands of multiple user equipments with the same transmit power control-radio network temporary identifier in the set of carriers, into the same physical downlink control channel using the downlink control information format 3/3A and scrambled with the said same transmit power control-radio network temporary identifier, and to transmit the physical downlink control channel in the common search space of the search carrier corresponding to the set of carriers.

In connection with the twelfth aspect or the first possible implementation of the twelfth aspect, in a third possible implementation, the search carrier corresponding to each set of carriers is:

a downlink carrier, in the set of carriers, paired with an uplink carrier, corresponding to the set of carriers, on which uplink control information is transmitted;

or a downlink primary component carrier in the set of carriers.

In connection with the twelfth aspect or the first possible implementation of the twelfth aspect, in a fourth possible implementation, the transmit power control-radio network temporary identifier includes a transmit power control-physical uplink control channel-radio network temporary identifier or a transmit power control-physical uplink shared channel-radio network temporary identifier.

In the technical solutions according to the embodiments of the invention, the uplink power control commands corresponding to the respective sets of carriers are transmitted using the downlink control information format 3/3A, at the physical downlink control channel locations indicated by the transmit power control-indexes corresponding to the respective sets of carriers, in the common search space of the primary carrier of the user equipment, after being scrambled with the transmit power control-radio network temporary identifiers corresponding to the respective sets of carriers; or the uplink power control commands corresponding to the respective sets of carriers are transmitted using the downlink control information format 3/3A, at the physical downlink control channel locations indicated by the transmit power control-indexes corresponding to the respective sets of carriers, in the common search spaces of the search carriers in the respective sets of carriers, after being scrambled with the transmit power control-radio network temporary identifiers corresponding to the respective sets of carriers. In this way, when the user equipment supports transmission of uplink channels on different uplink carriers corresponding to different sets of carriers, corresponding uplink power control commands can be transmitted so that the system operates normally and stably.

DETAILED DESCRIPTION OF THE EMBODIMENTS

Figure 1:
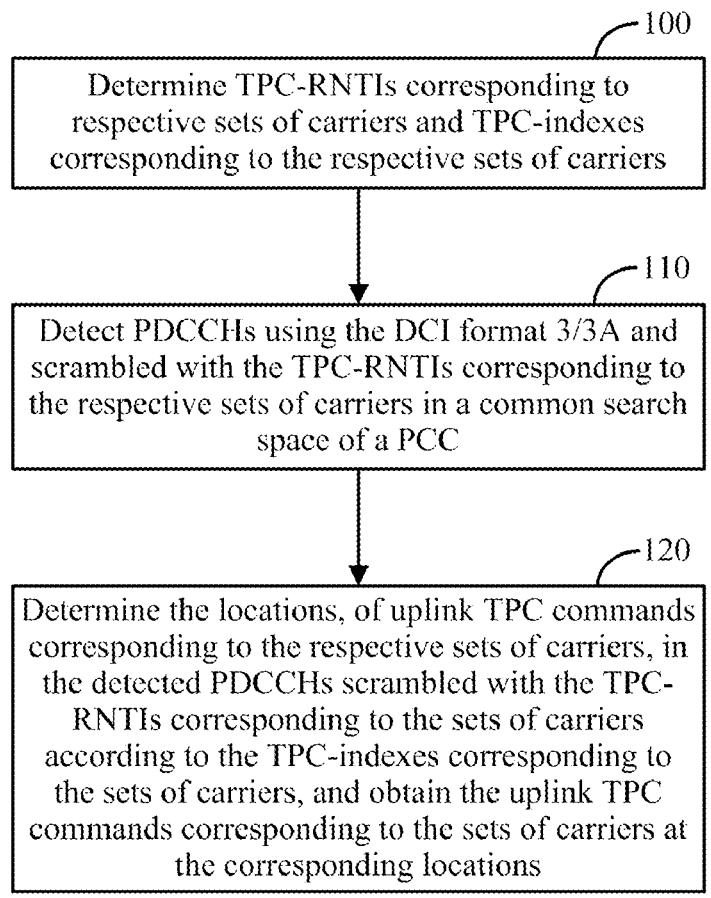
FIG. 1 illustrates a flow chart at the UE side according to embodiments of a first implementation of the invention.

In order to make the objects, technical solutions and advantages of the embodiments of the invention more apparent, the technical solutions according to the embodiments of the invention will be described below clearly and fully with reference to the drawings in the embodiments of the invention, and apparently the embodiments described below are only a part but not all of the embodiments of the invention. Based upon the embodiments here of the invention, all the other embodiments which can occur to those skilled in the art without any inventive effort shall fall into the scope of the invention as claimed.

When a UE supports transmission of uplink channels on different uplink carriers corresponding to different set of carriers, the embodiments of the invention provide technical solutions as follows: carriers, on which uplink TPC commands are transmitted, are predetermined among aggregated carriers configured for the UE; and when the uplink TPC commands need to be obtained, the uplink TPC commands corresponding to the respective sets of carriers are obtained, through PDCCHs using the DCI format 3/3A and scrambled with TPC-RNTIs corresponding to the respective sets of carriers, in a common search space of the carriers on which the uplink TPC commands are transmitted, where the locations of the uplink TPC commands, corresponding to the respective sets of carriers, in the PDCCH are indicated by TPC-indexes corresponding to the respective sets of carriers, so that when the UE supports transmission of uplink channels on different uplink carriers corresponding to different set of carriers, corresponding uplink TPC commands are transmitted and obtained, so that the system operates normally and stably.

Particularly there are two implementations of the solution to transmission of an uplink TPC command according to the embodiments of the invention. In a first implementation, the carrier on which the uplink TPC command is transmitted is a PCC of the UE. Accordingly the uplink TPC commands corresponding to the respective sets of carriers are transmitted, in the PDCCHs scrambled with the TPC-RNTIs corresponding to the respective sets of carriers and using the DCI format 3/3A, at the locations, of the TPC commands of the sets of carriers, in the PDCCHs, indicated by the TPC-indexes corresponding to the respective sets of carriers, in a common search space of the PCC of the UE, where the uplink TPC commands corresponding to the respective sets of carriers with the same TPC-RNTI can be transmitted in the same PDCCH. In a second implementation, particular one of carriers in each set of carriers is configured or specified as a carrier, corresponding to the set of carriers, on which the uplink TPC command is transmitted, and also referred to as a search carrier. Accordingly the uplink TPC command corresponding to each set of carriers is transmitted, in the PDCCH scrambled with the TPC-RNTI corresponding to the set of carriers and using the DCI format 3/3A, at the location, of the TPC command of the set of carriers, in the PDCCH, indicated by the TPC-index corresponding to the set of carriers, in a common search space of the search carrier in the set of carriers.

The technical solution according to the embodiments of the invention will be described below in details with reference to the drawings.

For the first implementation of transmitting an uplink TPC command according to the embodiments of the invention, FIG. 1 illustrates that its implementation at the UE side particularly includes the following operations:

The operation 100 is to determine TPC-RNTIs corresponding to respective sets of carriers and TPC-indexes corresponding to the respective sets of carriers.

Here the sets of carriers particularly refer to sets of carriers into which aggregated carriers for the UE are grouped.

The operation 110 is to detect PDCCHs using the DCI format 3/3A and scrambled with the TPC-RNTIs corresponding to the respective sets of carriers in a common search space of a PCC.

Here the PCC particularly refers to a PCC configured for the UE. In the operation 110, particularly the PDCCHs scrambled with the TPC-RNTIs corresponding to the respective sets of carriers are detected blindly in the common search space of the PCC using the TPC-RNTIs corresponding to the respective sets of carriers determined in the operation 100 and using the DCI format 3/3A, where the number of detected PDCCHs is determined by a particular TPC-RNTI configuration condition so that when a plurality of sets of carriers of the UE correspond to the same TPC-RNTI, only one PDCCH may be detected, and when not all of the TPC-RNTIs corresponding to a plurality of sets of carriers of the UE are the same, a plurality of PDCCHs may be detected.

The operation 120 is to determine the locations, of uplink TPC commands corresponding to the respective sets of carriers, in the detected PDCCHs scrambled with the TPC-RNTIs corresponding to the sets of carriers according to the TPC-indexes corresponding to the sets of carriers, and to obtain the uplink TPC commands corresponding to the sets of carriers at the corresponding locations.

Here the TPC-index is configured to indicate the location, of the uplink TPC command corresponding to the set of carriers, in the PDCCH.

The uplink TPC command corresponding to the set of carriers particularly refers to an uplink TPC command of an uplink channel (which can refer to only the PUCCH or can include a PUSCH and an SRS) on a particular carrier, corresponding to the set of carriers, on which uplink control information is transmitted, or can refer to an uplink TPC command of an uplink channel (which can be a PUCCH, a PUSCH and an SRS) on any uplink carrier in the set of carriers.

In the operation 110, in the procedure of blind detection using the TPC-RNTIs corresponding to the respective sets of carriers, if there is successful blind detection, then the corresponding PDCCHs are also de-scrambled successfully, and a correspondence relationship between the PDCCHs and the TPC-RNTIs is determined, that is, a correspondence relationship between the PDCCHs and the respective sets of carriers is determined. Thus in the operation 120, after the location, of the uplink TPC command corresponding to the set i of carriers, in the PDCCH is determined, the uplink TPC command corresponding to the set i of carriers can be obtained from the PDCCH de-scrambled with the TPC-RNTI corresponding to the set i of carriers.

Further to the embodiment of the method for transmitting an uplink TPC command illustrated in FIG. 1, there are a number of possible particular implementations of the operation 100, several of which will be described below by way of an example:

(First Approach)

A TPC-RNTI corresponding to the UE is determined as indicated by higher-layer signaling or as predefined with the network side, where the TPC-RNTI corresponding to the UE is used as the TPC-RNTI corresponding to each set of carriers of the UE.

TPC-indexes corresponding to the respective sets of carriers are determined as indicated by higher-layer signaling or as predefined with the network side. Or, a TPC-index corresponding to the UE, and Transmit Power Control-index-offsets (TPC-index-offsets) corresponding to the respective sets of carriers are determined as indicated by higher-layer signaling or as predefined with the network side, and TPC-indexes corresponding to the respective sets of carriers are determined according to the TPC-index corresponding to the UE, and the TPC-index-offsets corresponding to the respective sets of carriers.

For example, if the TPC-index corresponding to the UE is represented as $TPC-index_{UE}$, and the TPC-index-offset corresponding to the set i of carriers is represented as $TPC-index-offset_i$, then the TPC-index corresponding to the set i of carriers is represented as $TPC-index_{UE}+TPC-index-offset_i$.

Here if the TPC-RNTIs corresponding to the respective sets of carries are the same, then the uplink TPC commands corresponding to the respective sets of carries can be packaged into the same PDCCH for transmission, so TPC-indexes corresponding to different sets of carriers need to be predetermined to be different from each other.

Suppose there are four carriers C1, C2, C3 and C4 aggregated in the system, then the C1 is a PCC of the UE, and the four carriers are grouped into two sets of carriers, which are a set S1 of carriers={C1, C2}, and a set S2 of carriers={C3, C4}.

Further to the first approach of the operation 100, an eNB configures the UE with a $TPC-PUCCH-RNTI_{UE}$, the S1 with a $TPC-index_1$, and the S2 with a $TPC-index_2$.

Here the $TPC-index_1$ is different from the $TPC-index_2$.

A particular implementation of transmitting the uplink TPC commands at the UE side can be as follows:

A PDCCH using the DCI format 3/3A and scrambled with the TPC-PUCCH-RNTI$_{UE}$ is detected in a common search space of the carrier C1.

The location, of an uplink TPC command corresponding to the S1, in the detected PDCCH is determined according to the TPC-index$_1$, and the uplink TPC command corresponding to the S1 is obtained at the corresponding location.

The location, of an uplink TPC command corresponding to the S2, in the detected PDCCH is determined according to the TPC-index$_2$, and the uplink TPC command corresponding to the S2 is obtained at the corresponding location.

Further to the first approach of the operation 100, an eNB configures the UE with a TPC-PUCCH-RNTI$_{UE}$ and a TPC-index$_{UE}$, the S1 with a TPC-index-offset$_1$, and the S2 with a TPC-index-offset$_2$.

Here the TPC-index-offset$_1$ is different from the TPC-index-offset$_2$.

A particular implementation of transmitting the uplink TPC commands at the UE side can be as follows:

A PDCCH using the DCI format 3/3A and scrambled with the TPC-PUCCH-RNTI$_{UE}$ is detected in a common search space of the carrier C1.

The location, of an uplink TPC command corresponding to the S 1, in the detected PDCCH is determined according to the TPC-index$_{UE}$+the TPC-index-offset$_1$, and the uplink TPC command corresponding to the S1 is obtained at the corresponding location.

The location, of an uplink TPC command corresponding to the S2, in the detected PDCCH is determined according to the TPC-index+the TPC-index-offset$_2$, and the uplink TPC command corresponding to the S2 is obtained at the corresponding location.

(Second Approach)

TPC-RNTIs corresponding to the respective sets of carriers are determined as indicated by higher-layer signaling or as predefined with the network side, where TPC-RNTIs corresponding to different sets of carriers are different from each other.

A TPC-index corresponding to the UE is determined as indicated by higher-layer signaling or as predefined with the network side, where the TPC-index corresponding to the UE is used as the TPC-index corresponding to each set of carriers of the UE.

Suppose there are four carriers C1, C2, C3 and C4 aggregated in the system, then the C1 is a PCC of the UE, and the four carriers are grouped into two sets of carriers, which are a set S1 of carriers={C1, C2}, and a set S2 of carriers={C3, C4}.

Further to the second approach of the operation 100, an eNB configures the UE with a TPC-index$_{UE}$, the S1 with a TPC-PUCCH-RNTI$_1$ and the S2 with a TPC-PUCCH-RNTI$_2$.

Here the TPC-PUCCH-RNTI$_1$ is different from the TPC-PUCCH-RNTI$_2$.

A particular implementation of transmitting the uplink TPC commands at the UE side can be as follows:

A PDCCH$_1$ scrambled with the TPC-PUCCH-RNTI$_1$, and a PDCCH$_2$ scrambled with the TPC-PUCCH-RNTI$_2$, both of which are using the DCI format 3/3A are detected in a common search space of the carrier C1.

The location, of an uplink TPC command corresponding to the S1, in the detected PDCCH$_1$ is determined according to the TPC-index$_{UE}$, and the uplink TPC command corresponding to the S1 is obtained at the corresponding location.

The location, of an uplink TPC command corresponding to the S2, in the detected PDCCH$_2$ is determined according to the TPC-index$_{UE}$, and the uplink TPC command corresponding to the S2 is obtained at the corresponding location.

(Third Approach)

TPC-RNTIs corresponding to the respective sets of carriers are determined as indicated by higher-layer signaling or as predefined with the network side, where TPC-RNTIs corresponding to different sets of carriers are different from each other.

TPC-indexes corresponding to the respective sets of carriers are determined as indicated by higher-layer signaling or as predefined with the network side. Or, a TPC-index corresponding to the UE, and TPC-index-offsets corresponding to the respective sets of carriers are determined as indicated by higher-layer signaling or as predefined with the network side, and TPC-indexes corresponding to the respective sets of carriers are determined according to the TPC-index corresponding to the UE, and the TPC-index-offsets corresponding to the respective sets of carriers.

Since TPC-RNTIs corresponding to different sets of carriers are different from each other, and the uplink TPC commands corresponding to the different sets of carriers are transmitted in the different PDCCH, TPC-indexes corresponding to different sets of carriers may be the same or may be different.

Suppose there are four carriers C1, C2, C3 and C4 aggregated in the system, then the C1 is a PCC of the UE, and the four carriers are grouped into two sets of carriers, which are a set S1 of carriers={C1, C2}, and a set S2 of carriers={C3, C4}.

Further to the third approach of the operation 100, an eNB configures the S1 with a TPC-PUCCH-RNTI$_1$ and a TPC-index$_1$, and the S2 with a TPC-PUCCH-RNTI$_2$ and a TPC-index$_2$.

Here the TPC-PUCCH-RNTI$_1$ is different from the TPC-PUCCH-RNTI$_2$, and the TPC-index$_1$ may be the same as or may be different from the TPC-index$_2$.

A particular implementation of transmitting the uplink TPC commands at the UE side can be as follows:

A PDCCH$_1$ scrambled with the TPC-PUCCH-RNTI$_1$, and a PDCCH$_2$ scrambled with the TPC-PUCCH-RNTI$_2$, both of which are using the DCI format 3/3A are detected in a common search space of the carrier C1.

The location, of an uplink TPC command corresponding to the S1, in the detected PDCCH$_1$ is determined according to the TPC-index$_1$, and the uplink TPC command corresponding to the S1 is obtained at the corresponding location.

The location, of an uplink TPC command corresponding to the S2, in the detected PDCCH$_2$ is determined according to the TPC-index$_2$ and the uplink TPC command corresponding to the S2 is obtained at the corresponding location.

(Fourth Approach)

TPC-RNTIs corresponding to the respective sets of carriers are determined as indicated by higher-layer signaling or as predefined with the network side, where not all of TPC-RNTIs corresponding to different sets of carriers are the same.

TPC-indexes corresponding to the respective sets of carriers are determined as indicated by higher-layer signaling or as predefined with the network side. Or, a TPC-index corresponding to the UE, and TPC-index-offsets corresponding to the respective sets of carriers are determined as indicated by higher-layer signaling or as predefined with the network side, and TPC-indexes corresponding to the respective sets of carriers are determined according to the TPC-index corresponding to the UE, and the TPC-index-offsets corresponding to the respective sets of carriers.

Here sets of carriers corresponding to the same TPC-RNTI correspond to different TPC-indexes.

Sets of carriers corresponding to different TPC-RNTIs correspond to TPC-indexes which may be the same as or may be different from each other.

Preferably further to the first or fourth approach of the operation 100, in a particular implementation of the operation 120, when a plurality of sets of carriers of the UE correspond to the same TPC-RNTI, the locations, of uplink TPC commands corresponding to the respective sets of carriers, in the detected PDCCH scrambled with the TPC-RNTI are determined according to TPC-indexes corresponding to the respective sets of carriers corresponding to the same TPC-RNTI, and the uplink TPC commands corresponding to the respective sets of carriers are obtained at the corresponding locations.

Figure 2:
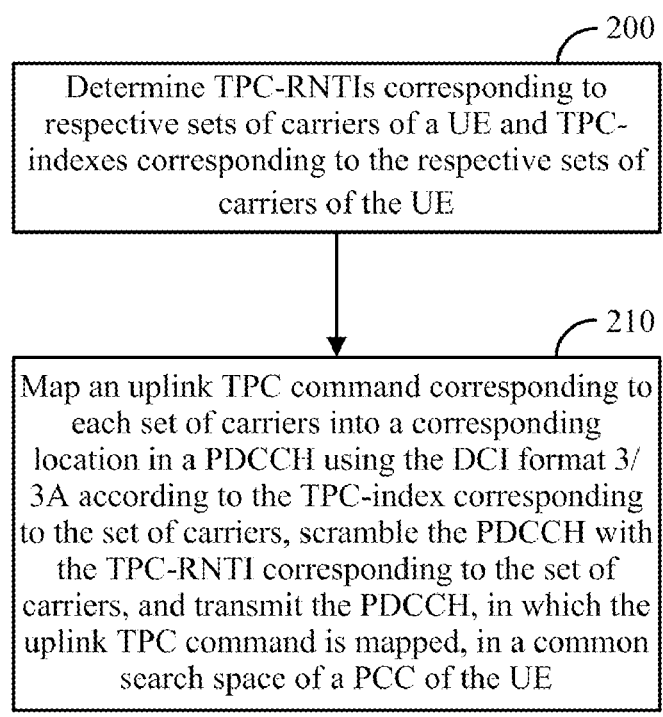
FIG. 2 illustrates a flow chart at the network side according to embodiments of the first implementation of the invention.

For the first implementation of transmitting an uplink TPC command according to the embodiments of the invention, FIG. 2 illustrates that its implementation at the network side particularly includes the following operations:

The operation 200 is to determine TPC-RNTIs corresponding to respective sets of carriers of a UE and TPC-indexes corresponding to the respective sets of carriers.

The operation 210 is to map an uplink TPC command corresponding to each set of carriers into a corresponding location in a PDCCH using the DCI format 3/3A according to the TPC-index corresponding to the set of carriers, to scramble the PDCCH with the TPC-RNTI corresponding to the set of carriers, and to transmit the PDCCH, in which the uplink TPC command is mapped, in a common search space of a PCC of the UE.

Here the particular PDCCH, into which the uplink TPC command to be mapped, can be determined according to the corresponding TPC-RNTI, the size of the uplink TPC command, a resource occupancy condition, etc., although the embodiment of the invention will not be limited to any particular mapping rule. For example, uplink TPC commands corresponding to a plurality of sets of carriers corresponding to the same TPC-RNTI can be mapped into the same PDCCH. Uplink TPC commands corresponding to a plurality of sets of carriers corresponding to different TPC-RNTIs can be mapped into different PDCCHs. The particular PDCCHs, into which the uplink TPC commands to be mapped, can be determined under an existing resource configuration rule.

Reference can be made to the description of the embodiment at the UE side for a particular implementation of technical features, in the description of the embodiment at the eNB side, which correspond to the UE side, so a repeated description thereof will be omitted here.

Further to the embodiment of the method for transmitting an uplink TPC command illustrated in FIG. 2, there are a number of possible particular implementations of the operation 200, several of which will be described below by way of an example:

(First Approach)

A TPC-RNTI corresponding to the UE is determined as predefined with the UE. Or, a TPC-RNTI corresponding to the UE is determined, and the UE is configured with the TPC-RNTI in higher-layer signaling, where the TPC-RNTI corresponding to the UE is used as the TPC-RNTI corresponding to each set of carriers of the UE.

TPC-indexes corresponding to the respective sets of carriers of the UE are determined as predefined with the UE. Or, TPC-indexes corresponding to the respective sets of carriers of the UE are determined, and the UE is configured with the TPC-indexes in higher-layer signaling. Or, a TPC-index corresponding to the UE, and TPC-index-offsets corresponding to the respective sets of carriers of the UE are determined as predefined with the UE; or a TPC-index corresponding to the UE, and TPC-index-offsets corresponding to the respective sets of carriers of the UE are determined, and the UE is configured with the TPC-index and the TPC-index-offsets in higher-layer signaling; and TPC-indexes corresponding to the respective sets of carriers of the UE are determined according to the TPC-index corresponding to the UE, and the TPC-index-offsets corresponding to the respective sets of carriers of the UE.

Here TPC-indexes corresponding to different sets of carriers are different from each other.

Suppose there are four carriers C1, C2, C3 and C4 aggregated in the system, then the C1 is a PCC of the UE, and the four carriers are grouped into two sets of carriers, which are a set S1 of carriers={C1, C2}, and a set S2 of carriers={C3, C4}.

Further to the first approach of the operation 200, an eNB configures the UE with a TPC-PUCCH-RNTI$_{UE}$, the S1 with a TPC-index1, and the S2 with a TPC-index2.

Here the TPC-index1 is different from the TPC-index2.

A particular implementation of transmitting the uplink TPC commands at the network-side device can be as follows:

The location, of an uplink TPC command corresponding to the S1, in a PDCCH is determined according to the TPC-index1.

The location, of an uplink TPC command corresponding to the S2, in the PDCCH is determined according to the TPC-index2.

After the PDCCH of a common search space of the C1, on which the uplink TPC commands to be transmitted, is scrambled with the TPC-PUCCH-RNTI$_{UE}$, the uplink TPC command corresponding to the S1 and the uplink TPC command corresponding to the S2 are transmitted using the DCI format 3/3A on the PDCCH at the location, of the uplink TPC command corresponding to the S1, in the PDCCH, and the location, of the uplink TPC command corresponding to the S2, in the PDCCH.

Further to the first approach of the operation 200, the eNB configures the UE with a TPC-PUCCH-RNTI$_{UE}$ and a TPC-index$_{UE}$, the S1 with a TPC-index-offset1, and the S2 with a TPC-index-offset2.

Here the TPC-index-offset1 is different from the TPC-index-offset2.

A particular implementation of transmitting the uplink TPC commands at the network-side device can be as follows:

The location, of an uplink TPC command corresponding to the S1, in a PDCCH is determined according to the TPC-index$_{UE}$+the TPC-index-offset1.

The location, of an uplink TPC command corresponding to the S2, in a PDCCH is determined according to the TPC-index$_{UE}$+the TPC-index-offset2.

After the PDCCH of a common search space of the C1, on which the uplink TPC commands to be transmitted, is scrambled with the TPC-PUCCH-RNTI$_{UE}$, the uplink TPC command corresponding to the S1 and the uplink TPC command corresponding to the S2 are transmitted using the DCI format 3/3A on the PDCCH at the location, of the uplink TPC command corresponding to the S1, in the PDCCH, and the location, of the uplink TPC command corresponding to the S2, in the PDCCH.

(Second Approach)

TPC-RNTIs corresponding to the respective sets of carriers of the UE are determined as predefined with the UE. Or, TPC-RNTIs corresponding to the respective sets of carriers of the UE are determined, and the UE is configured with the TPC-RNTIs in higher-layer signaling, where TPC-RNTIs corresponding to different sets of carriers are different from each other.

A TPC-index corresponding to the UE is determined as predefined with the UE, or, a TPC-index corresponding to the UE is determined and the UE is configured with the TPC-index in higher-layer signaling, where the TPC-index corresponding to the UE is used as the TPC-index corresponding to each set of carriers of the UE.

Suppose there are four carriers C1, C2, C3 and C4 aggregated in the system, then the C1 is a PCC of the UE, and the four carriers are grouped into two sets of carriers, which are a set S1 of carriers={C1, C2}, and a set S2 of carriers={C3, C4}.

Further to the second approach of the operation 200, the eNB configures the UE with a TPC-index$_{UE}$, the S1 with a TPC-PUCCH-RNTI1, and the S2 with a TPC-PUCCH-RNTI2.

Here the TPC-PUCCH-RNTI1 is different from the TPC-PUCCH-RNTI2.

A particular implementation of transmitting the uplink TPC commands at the network-side device can be as follows:

The location, of an uplink TPC command corresponding to the S1, in a PDCCH1 is determined according to the TPC-index$_{UE}$.

The location, of an uplink TPC command corresponding to the S2, in a PDCCH2 is determined according to the TPC-index$_{UE}$.

After a PDCCH1 of a common search space of the C1, on which the uplink TPC command corresponding to the S1 to be transmitted, is scrambled with the TPC-PUCCH-RNTI1, the uplink TPC command corresponding to the S1 is transmitted using the DCI format 3/3A on the PDCCH1 at the location, of the uplink TPC command corresponding to the S1, in the PDCCH1.

After a PDCCH2 of the common search space of the C1, on which the uplink TPC command corresponding to the S2 to be transmitted, is scrambled with the TPC-PUCCH-RNTI2, the uplink TPC command corresponding to the S2 is transmitted using the DCI format 3/3A on the PDCCH2 at the location, of the uplink TPC command corresponding to the S2, in the PDCCH2.

(Third Approach)

TPC-RNTIs corresponding to the respective sets of carriers of the UE are determined as predefined with the UE. Or TPC-RNTIs corresponding to the respective sets of carriers of the UE are determined, and the UE is configured with the TPC-RNTIs in higher-layer signaling, where TPC-RNTIs corresponding to different sets of carriers are different from each other.

TPC-indexes corresponding to the respective sets of carriers of the UE are determined as predefined with the UE. Or TPC-indexes corresponding to the respective sets of carriers of the UE are determined, and the UE is configured with the TPC-indexes in higher-layer signaling. Or a TPC-index corresponding to the UE, and TPC-index-offsets corresponding to the respective sets of carriers of the UE are determined as predefined with the UE; or a TPC-index corresponding to the UE, and TPC-index-offsets corresponding to the respective sets of carriers of the UE are determined, and the UE is configured with the TPC-index and the TPC-index-offsets in higher-layer signaling; and TPC-indexes corresponding to the respective sets of carriers of the UE are determined according to the TPC-index corresponding to the UE, and the TPC-index-offsets corresponding to the respective sets of carriers.

Suppose there are four carriers C1, C2, C3 and C4 aggregated in the system, then the C1 is a PCC of the UE, and the four carriers are grouped into two sets of carriers, which are a set S1 of carriers={C1, C2}, and a set S2 of carriers={C3, C4}.

Further to the third approach of the operation 200, the eNB configures the S1 with a TPC-PUCCH-RNTI1 and a TPC-index1, and the S2 with a TPC-PUCCH-RNTI2 and a TPC-index2.

Here the TPC-PUCCH-RNTI1 is different from the TPC-PUCCH-RNTI2, and the TPC-index1 may be the same as or may be different from the TPC-index2.

A particular implementation of transmitting the uplink TPC commands at the network-side device can be as follows:

The location, of an uplink TPC command corresponding to the S1, in a PDCCH1 is determined according to the TPC-index1.

The location, of an uplink TPC command corresponding to the S2, in a PDCCH2 is determined according to the TPC-index2.

After a PDCCH1 of a common search space of the C1, on which the uplink TPC command corresponding to the S1 to be transmitted, is scrambled with the TPC-PUCCH-RNTI1, the uplink TPC command corresponding to the S1 is transmitted using the DCI format 3/3A on the PDCCH1 at the location, of the uplink TPC command corresponding to the S1, in the PDCCH1.

After a PDCCH2 of the common search space of the C1, on which the uplink TPC command corresponding to the S2 to be transmitted, is scrambled with the TPC-PUCCH-RNTI2, the uplink TPC command corresponding to the S2 is transmitted using the DCI format 3/3A on the PDCCH2 at the location, of the uplink TPC command corresponding to the S2, in the PDCCH2.

(Fourth Approach)

TPC-RNTIs corresponding to the respective sets of carriers of the UE are determined as predefined with the UE. Or TPC-RNTIs corresponding to the respective sets of carriers are determined, and the UE is configured with the TPC-RNTIs in higher-layer signaling, not all of TPC-RNTIs corresponding to different sets of carriers are the same.

TPC-indexes corresponding to the respective sets of carriers of the UE are determined as predefined with the UE. Or TPC-indexes corresponding to the respective sets of carriers of the UE are determined, and the UE is configured with the TPC-indexes in higher-layer signaling. Or a TPC-index corresponding to the UE, and TPC-index-offsets corresponding to the respective sets of carriers of the UE are determined as predefined with the UE; or a TPC-index corresponding to the UE, and TPC-index-offsets corresponding to the respective sets of carriers of the UE are determined, and the UE is configured with the TPC-index and the TPC-index-offsets in higher-layer signaling; and TPC-indexes corresponding to the respective sets of carriers of the UE are determined according to the TPC-index corresponding to the UE, and the TPC-index-offsets corresponding to the respective sets of carriers of the UE.

Here sets of carriers corresponding to the same TPC-RNTI correspond to different TPC-indexes.

In the respective embodiments at the eNB side where the sets of carriers correspond to different TPC-RNTIs, preferably the uplink TPC commands corresponding to the sets of carriers of the UE corresponding to different TPC-RNTIs are mapped into PDCCHs using the DCI format 3/3A and scrambled with the corresponding different TPC-RNTIs respectively, and the plurality of PDCCHs, into which the uplink TPC commands are mapped, are transmitted in the common search space of the PCC of the UE respectively in different downlink sub-frames.

Since transmission of the uplink TPC commands corresponding to the respective sets of carriers using the DCI format 3/3A in the common search space of the PCC is a TPC multicast transmission approach, uplink TPC commands corresponding to sets of carriers of a plurality of UEs can be transmitted in the same PDCCH. If the uplink TPC commands corresponding to the different sets of carriers are transmitted in the same PDCCH, then the PDCCH needs to be scrambled with the same TPC-RNTI. Thus further to the TPC-RNTI and the TPC-indexes determined in the first approach, preferably respective sets of carriers of the same UE correspond to the same TPC-RNTI, so uplink TPC commands corresponding to the respective sets of carriers of the UE can be transmitted in the same PDCCH using the DCI format 3/3A and scrambled with the TPC-RNTI; and further to the TPC-RNTIs and the TPC-indexes determined in the fourth approach, preferably a part of sets of carriers of the same UE correspond to the same TPC-RNTI, so uplink TPC commands corresponding to the sets of carriers of the UE with the same TPC-RNTI can be transmitted in the same PDCCH using the DCI format 3/3A and scrambled with the TPC-RNTI. That is, the uplink TPC commands corresponding to the sets of carriers of the UE corresponding to the same TPC-RNTI are mapped into the same PDCCH using the DCI format 3/3A and scrambled with the same TPC-RNTI, and the PDCCH is transmitted in the common search space of the PCC of the UE.

Moreover further to the TPC-RNTIs and the TPC-indexes determined in the fourth approach, as for a set of carriers of another UE, the TPC-RNTI corresponding to which is the same to the TPC-RNTI corresponding to the set i of carriers of the above UE and the TPC-index corresponding to which is different from the TPC-index corresponding to the set i of carriers of the above UE, uplink TPC command corresponding to the set of carriers of the another UE can also be transmitted in the same PDCCH using the DCI format 3/3A and scrambled with the same TPC-RNTI as the uplink TPC command corresponding to the set i of carriers of the above UE, and accordingly based on the supposed grouping of carriers above, furthermore suppose carriers of each UE in the system are grouped in the same manner, and the PCC of each UE is C1, then taking the S1 as an example, TPC-PUCCH-RNTIs or TPC-indexes configured for the S1 of different UEs are different.

Further to any preceding embodiment at the network side, preferably in a particular implementation of the operation 210, uplink TPC commands corresponding to sets of carriers with the same TPC-RNTI of different UEs are mapped into the same PDCCH using the DCI format 3/3A and scrambled with the same TPC-RNTI, and the PDCCH is transmitted in the common search space of the PCC of the UE.

Figure 3:
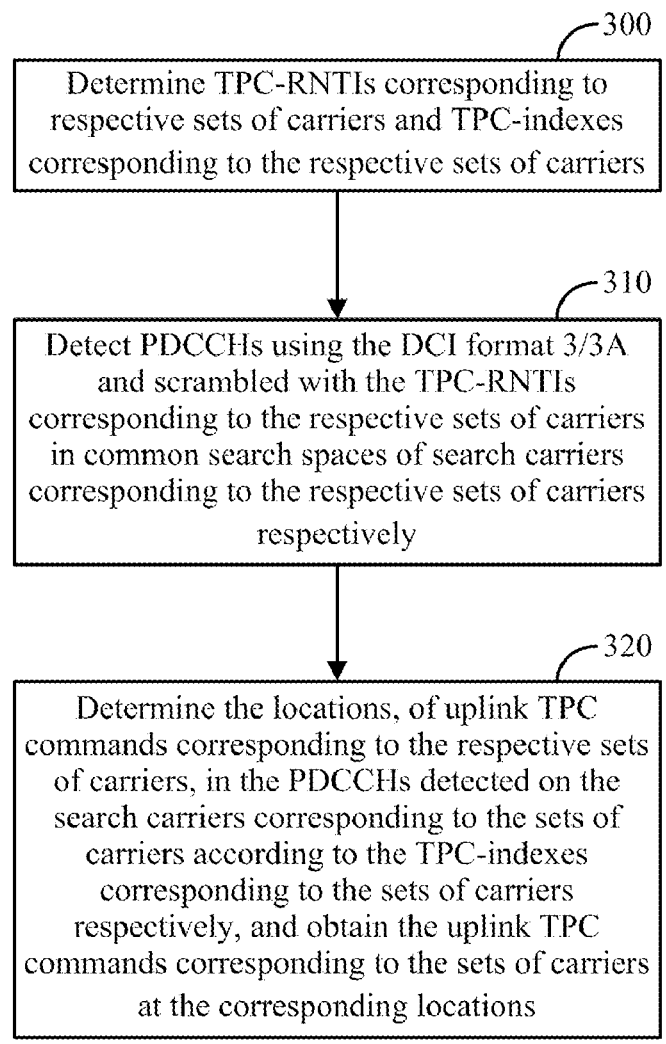
FIG. 3 illustrates a flow chart at the UE side according to embodiments of a second implementation of the invention.

For the second implementation of transmitting an uplink TPC command according to the embodiments of the invention, FIG. 3 illustrates that its implementation at the UE side particularly includes the following operations:

The operation 300 is to determine TPC-RNTIs corresponding to respective sets of carriers and TPC-indexes corresponding to the respective sets of carriers.

Here the sets of carriers particularly refer to sets of carriers into which aggregated carriers for the UE are grouped.

The operation 310 is to detect PDCCHs using the DCI format 3/3A and scrambled with the TPC-RNTIs corresponding to the respective sets of carriers in common search spaces of search carriers corresponding to the respective sets of carriers respectively.

Here the search carrier corresponding to each set of carriers is such a carrier in the set of carriers that is preconfigured in higher-layer signaling or predefined with the network side.

Here the PDCCHs can be detected particularly as described in the embodiment at the UE side in the first implementation, so a repeated description thereof will be omitted here.

The operation 320 is to determine the locations, of uplink TPC commands corresponding to the respective sets of carriers, in the PDCCHs detected on the search carriers corresponding to the sets of carriers according to the TPC-indexes corresponding to the sets of carriers respectively, and to obtain the uplink TPC commands corresponding to the sets of carriers at the corresponding locations.

Reference can be made to the description of the embodiment at the UE side in the first implementation for a particular implementation of the operation 320, so a repeated description thereof will be omitted here.

Since uplink TPC commands corresponding to different sets of carriers are transmitted respectively on different carriers, in a preferred implementation of determining the TPC-RNTIs corresponding to the respective sets of carriers in the operation 300, a TPC-RNTI corresponding to the UE is determined as indicated by higher-layer signaling or as predefined with the network side, where the TPC-RNTI corresponding to the UE is used as the TPC-RNTI corresponding to each set of carriers of the UE. Of course the TPC-RNTIs corresponding to the respective sets of carriers can alternatively be predetermined so that they are different from each other or not all of them are the same.

In a preferred implementation of determining the TPC-indexes corresponding to the respective sets of carriers, a TPC-index corresponding to the UE is determined as indicated by higher-layer signaling or as predefined with the network side, where the TPC-index corresponding to the UE is used as the TPC-index corresponding to each set of carriers of the UE. Of course TPC-indexes corresponding to the respective sets of carriers can alternatively be determined as indicated by higher-layer signaling or as predefined with the network side; or a TPC index corresponding to the UE, and TPC-index-offsets corresponding to the respective sets of carriers can be determined as indicated by higher-layer signaling or as predefined with the network side, and TPC-indexes corresponding to the respective sets of carriers are determined according to the TPC-index corresponding to the UE, and the TPC-index-offsets corresponding to the respective sets of carriers.

In the second implementation of transmitting an uplink TPC command above at the UE side, preferably the search carrier corresponding to each set of carriers can be a downlink carrier, in the set of carriers, paired with an uplink carrier, corresponding to the set of carriers, on which uplink control information is transmitted; or a downlink PCC in the set of carriers.

Taking the set S1 of carriers including the carriers C1 and C2 as an example, in an FDD system, furthermore the carrier C1 includes an uplink carrier $C_{UL1}$ and a downlink carrier $C_{DL1}$, and the carrier C2 includes an uplink carrier $C_{UL2}$ and a downlink carrier $C_{DL2}$. If uplink control information is transmitted on the $C_{UL1}$, then a downlink carrier paired with the $C_{UL1}$ is the $C_{DL1}$. In a TDD system, the carrier C1 and the carrier C2 are downlink carriers in a downlink sub-frame, and the carrier C1 and the carrier C2 are uplink carriers in an uplink sub-frame, according to TDD uplink/downlink configurations. If uplink control information is transmitted on the C1 in the uplink sub-frame, then the C1 in the downlink sub-frame is a corresponding paired downlink carrier.

Suppose there are four carriers C1, C2, C3 and C4 aggregated in the system, then the C1 is a PCC of the UE, and the four carriers are grouped into two sets of carriers, which are a set S1 of carriers={C1, C2}, and a set S2 of carriers={C3, C4}. A carrier in the S1, on which uplink control information is transmitted, is the C1, and a carrier in the S2, on which uplink control information is transmitted, is the C4.

The eNB configures C1 as a search carrier corresponding to the S1, and configures C4 as a search carrier corresponding to the S2.

The eNB configures the UE with a TPC-index$_{UE}$ and the UE with a TPC-PUCCH-RNTI$_{UE}$.

A particular implementation of transmitting the uplink TPC commands at the UE side can be as follows:

A PDCCH1 using the DCI format 3/3A and scrambled with the TPC-PUCCH-RNTI$_{UE}$ is detected in a common search space of the C1.

A PDCCH2 using the DCI format 3/3A and scrambled with the TPC-PUCCH-RNTI$_{UE}$ is detected in a common search space of the C4.

The location, of an uplink TPC command corresponding to the S1, in the PDCCH1 is determined according to the TPC-index$_{UE}$, and the uplink TPC command corresponding to the S1 is obtained at the corresponding location.

The location, of an uplink TPC command corresponding to the S2, in the PDCCH2 is determined according to the TPC-index$_{UE}$, and the uplink TPC command corresponding to the S2 is obtained at the corresponding location.

Figure 4:
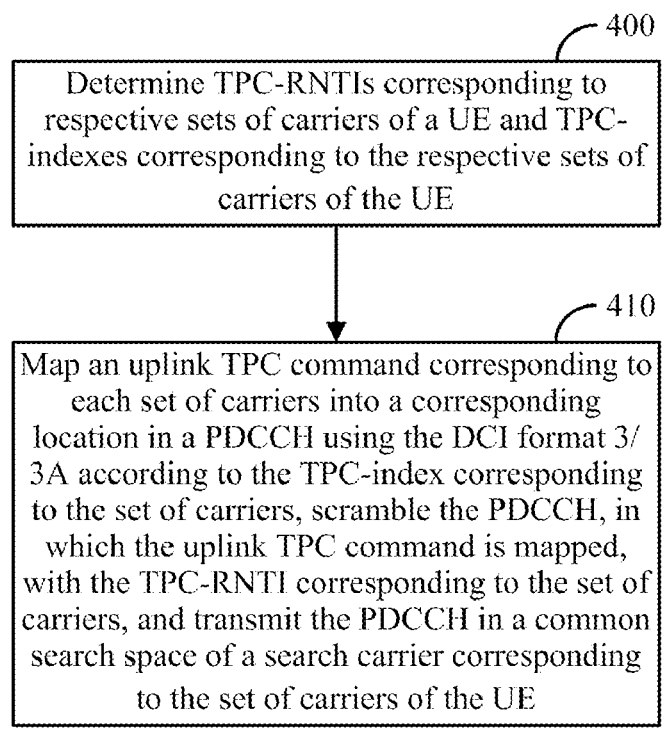
FIG. 4 illustrates a flow chart at the network side according to embodiments of the second implementation of the invention.

For the second implementation of transmitting an uplink TPC command according to the embodiments of the invention, FIG. 4 illustrates that its implementation at the network side particularly includes the following operations:

The operation 400 is to determine TPC-RNTIs corresponding to respective sets of carriers of a UE and TPC-indexes corresponding to the respective sets of carriers of the UE.

The operation 410 is to map an uplink TPC command corresponding to each set of carriers into a corresponding location in a PDCCH using the DCI format 3/3A according to the TPC-index corresponding to the set of carriers, to scramble the PDCCH, in which the uplink TPC command is mapped, with the TPC-RNTI corresponding to the set of carriers, and to transmit the PDCCH in a common search space of a search carrier corresponding to the set of carriers of the UE.

Here the search carrier corresponding to each set of carriers is such a carrier in the set of carriers that is preconfigured in higher-layer signaling or predefined with the UE.

Reference can be made to the description of the embodiment above at the UE side for a particular implementation of technical features, in this embodiment at the network side, which are similar to the embodiment illustrated in FIG. 1, so a repeated description thereof will be omitted here.

Since uplink TPC commands corresponding to different sets of carriers are transmitted respectively on different carriers, in a preferred implementation of determining the TPC-RNTIs corresponding to the respective sets of carriers in the operation 400, a TPC-RNTI corresponding to the UE is determined as predefined with the UE. Or, a TPC-RNTI corresponding to the UE is determined, and the UE is configured with the TPC-RNTI in higher-layer signaling. The TPC-RNTI corresponding to the UE is used as the TPC-RNTI corresponding to each set of carriers of the UE. Of course the TPC-RNTIs corresponding to the respective sets of carriers can alternatively be predetermined so that they are different from each other or not all of them are the same.

In a preferred implementation of determining the TPC-indexes corresponding to the respective sets of carriers, a TPC-index corresponding to the UE is determined as predefined with the UE. Or, a TPC-index corresponding to the UE is determined, and the UE is configured with the TPC-index in higher-layer signaling. The TPC-index corresponding to the UE is used as the TPC-index corresponding to each set of carriers of the UE. Of course TPC-indexes corresponding to the respective sets of carriers can alternatively be determined as predefined with the UE. Alternatively TPC-indexes corresponding to the respective sets of carriers can be determined, and the UE can be configured with the TPC-indexes in higher-layer signaling. Alternatively a TPC index corresponding to the UE, and TPC-index-offsets corresponding to the respective sets of carriers can be determined as predefined with the UE; and TPC-indexes corresponding to the respective sets of carriers can be determined according to the TPC-index corresponding to the UE, and the TPC-index-offsets corresponding to the respective sets of carriers. Alternatively a TPC index corresponding to the UE, and TPC-index-offsets corresponding to the respective sets of carriers can be determined, and the UE can be configured with the TPC index and the TPC-index-offsets in higher-layer signaling; and TPC-indexes corresponding to the respective sets of carriers can be determined according to the TPC-index corresponding to the UE, and the TPC-index-offsets corresponding to the respective sets of carriers.

Since transmission of the uplink TPC commands corresponding to the respective sets of carriers using the DCI format 3/3A in the common search space of the PCC is a TPC multicast transmission approach, uplink TPC commands of a plurality of UEs operating over the same set of carriers can be transmitted in the same PDCCH. If the uplink TPC commands corresponding to different sets of carriers are transmitted in the same PDCCH, then the PDCCH needs to be scrambled with the same TPC-RNTI. Thus in the second implementation of transmitting an uplink TPC command at the network side, preferably for each set of carriers, uplink TPC commands of multiple UEs with the same TPC-RNTI, are mapped into the same PDCCH using the DCI format 3/3A and scrambled with the said same TPC-RNTI, and the PDCCH is transmitted in a common search space of a search carrier corresponding to the set of carriers.

Moreover in the second implementation of transmitting an uplink TPC command according to the invention, the uplink TPC commands corresponding to the respective sets of carriers are transmitted respectively on their corresponding search carriers, so the uplink TPC commands corresponding to sets of carriers of different UEs operating on the same set of carriers are transmitted in the same PDCCH on another precondition that these sets of carriers correspond to the same search carrier.

In the second implementation of transmitting uplink TPC commands above at the network side, preferably the search carrier corresponding to each set of carriers can be a downlink carrier, in the set of carriers, paired with an uplink carrier, corresponding to the set of carriers, on which uplink control information is transmitted; or a downlink PCC in the set of carriers.

In the second implementation of transmitting uplink TPC commands above at the network side, preferably the network side further configures the UE with the search carriers of the respective sets of carriers. Accordingly the respective sets of carriers of the UE are configured with the search carriers, and configuration result is transmitted to the UE in high-layer signaling.

Suppose there are four carriers C1, C2, C3 and C4 aggregated in the system, then the C1 is a PCC of the UE, and the four carriers are grouped into two sets of carriers, which are a set S1 of carriers={C1, C2}, and a set S2 of carriers={C3, C4}. A carrier in the S1, on which uplink control information is transmitted, is the C1, and a carrier in the S2, on which uplink control information is transmitted, is the C4.

The eNB configures C1 as a search carrier corresponding to the S1, and configures C4 as a search carrier corresponding to the S2.

The eNB configures the UE with a TPC-index$_{UE}$ and the UE with a TPC-PUCCH-RNTI$_{UE}$.

A particular implementation of transmitting the uplink TPC commands at the network-side device can be as follows:

The location, of an uplink TPC command corresponding to the S1, in a PDCCH1 is determined according to the TPC-index$_{UE}$.

The location, of an uplink TPC command corresponding to the S2, in a PDCCH2 is determined according to the TPC-index$_{UE}$.

After the PDCCH1 in a common search space of the C1 is scrambled with the TPC-PUCCH-RNTI$_{UE}$, the uplink TPC command corresponding to the S1 is transmitted using the DCI format 3/3A on the PDCCH1 at the location, of the uplink TPC command corresponding to the S1, in the PDCCH1.

After the PDCCH2 in a common search space of the C4 is scrambled with the TPC-PUCCH-RNTI$_{UE}$, the uplink TPC command corresponding to the S2 is transmitted using the DCI format 3/3A on the PDCCH2 at the location, of the uplink TPC command corresponding to the S2, in the PDCCH2.

Figure 5:
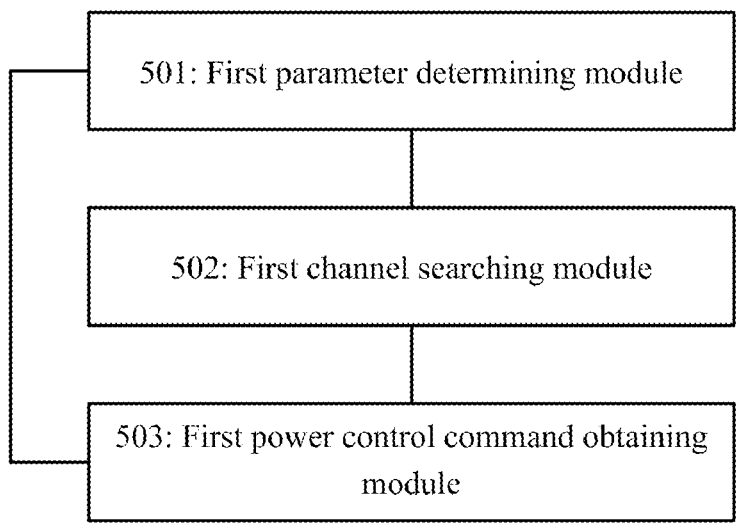
FIG. 5 illustrates a schematic structural diagram of a UE according to embodiments of the first implementation of the invention.

For the first implementation of transmitting an uplink TPC command according to the embodiments of the invention, an embodiment of the invention further provides a user equipment structured as illustrated in FIG. 5, and a particular implementation structure thereof includes:

A first parameter determining module 501 is configured to determine TPC-RNTIs corresponding to respective sets of carriers and TPC-indexes corresponding to the respective sets of carriers.

A first channel searching module 502 is configured to detect PDCCHs using the DCI format 3/3A and scrambled with the TPC-RNTIs corresponding to the respective sets of carriers in a common search space of a PCC.

A first power control command obtaining module 503 is configured to determine the locations, of uplink TPC commands corresponding to the respective sets of carriers, in the detected PDCCHs scrambled with the TPC-RNTIs corresponding to the sets of carriers according to the TPC-indexes corresponding to the sets of carriers, and to obtain the uplink TPC commands corresponding to the sets of carriers at the corresponding locations.

Preferably further to the embodiment of the user equipment illustrated in FIG. 5, the first parameter determining module 501 configured to determine the TPC-RNTIs corresponding to the respective sets of carriers is configured:

To determine a TPC-RNTI corresponding to the user equipment as indicated by higher-layer signaling or as predefined with the network side, where the TPC-RNTI corresponding to the user equipment is used as the TPC-RNTI corresponding to each set of carriers of the user equipment; and The first parameter determining module 501 configured to determine the TPC-indexes corresponding to the respective sets of carriers is configured:

To determine the TPC-indexes corresponding to the respective sets of carriers as indicated by higher-layer signaling or as predefined with the network side, where TPC-indexes corresponding to different sets of carriers are different from each other; or To determine a TPC-index corresponding to the user equipment, and TPC-index-offsets corresponding to the respective sets of carriers as indicated by higher-layer signaling or as predefined with the network side, and to determine the TPC-indexes corresponding to the respective sets of carriers according to the TPC-index corresponding to the user equipment, and the TPC-index-offsets corresponding to the respective sets of carriers, where TPC-indexes corresponding to different sets of carriers are different from each other.

Preferably further to the embodiment of the user equipment illustrated in FIG. 5, the first parameter determining module 501 configured to determine the TPC-RNTIs corresponding to the respective sets of carriers is configured:

To determine the TPC-RNTIs corresponding to the respective sets of carriers as indicated by higher-layer signaling or as predefined with the network side, where TPC-RNTIs corresponding to different sets of carriers are different from each other; and The first parameter determining module 501 configured to determine the TPC-indexes corresponding to the respective sets of carriers is configured:

To determine a TPC-index corresponding to the user equipment as indicated by higher-layer signaling or as predefined with the network side, where the TPC-index corresponding to the user equipment is a TPC-index corresponding to each set of carriers of the user equipment; or To determine the TPC-indexes corresponding to the respective sets of carriers as indicated by higher-layer signaling or as predefined with the network side; or To determine a TPC-index corresponding to the user equipment, and TPC-index-offsets corresponding to the respective sets of carriers as indicated by higher-layer signaling or as predefined with the network side, and to determine the TPC-indexes corresponding to the respective sets of carriers according to the TPC-index corresponding to the user equipment, and the TPC-index-offsets corresponding to the respective sets of carriers.

Preferably further to the embodiment of the user equipment illustrated in FIG. 5, the first parameter determining module 501 configured to determine the TPC-RNTIs corresponding to the respective sets of carriers is configured:

To determine the TPC-RNTIs corresponding to the respective sets of carriers as indicated by higher-layer signaling or as predefined with the network side, where not all of TPC-RNTIs corresponding to different sets of carriers are the same; and The first parameter determining module 501 configured to determine the TPC-indexes corresponding to the respective sets of carriers is configured:

To determine the TPC-indexes corresponding to the respective sets of carriers as indicated by higher-layer signaling or as predefined with the network side, where sets of carriers corresponding to the same TPC-RNTI correspond to different TPC-indexes; or To determine a TPC-index corresponding to the user equipment, and TPC-index-offsets corresponding to the respective sets of carriers as indicated by higher-layer signaling or as predefined with the network side, and to determine the TPC-indexes corresponding to the respective sets of carriers according to the TPC-index corresponding to the user equipment, and the TPC-index-offsets corresponding to the respective sets of carriers, where sets of carriers corresponding to the same TPC-RNTI correspond to different TPC-indexes.

In the case that the sets of carriers of the user equipment correspond to the same TPC-RNTI, preferably the first power control command obtaining module 503 is configured:

When a plurality of sets of carriers of the user equipment correspond to the same TPC-RNTI, to determine the locations, of the uplink TPC commands corresponding to the respective sets of carriers, in the detected PDCCH scrambled with the TPC-RNTI according to the TPC-indexes corresponding to the respective sets of carriers with the same TPC-RNTI, and to obtain the uplink TPC commands corresponding to the respective sets of carriers at the corresponding locations.

Figure 6:
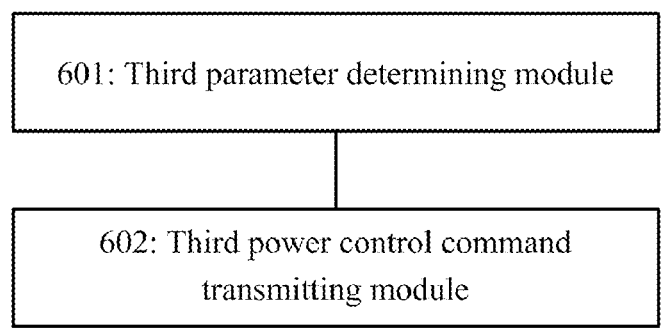
FIG. 6 illustrates a schematic structural diagram of a network-side device according to embodiments of the first implementation of the invention.

For the first implementation of transmitting an uplink TPC command according to the embodiments of the invention, an embodiment of the invention further provides a network-side device structured as illustrated in FIG. 6, and a particular implementation structure thereof includes:

A third parameter determining module 601 is configured to determine TPC-RNTIs corresponding to respective sets of carriers of a user equipment and TPC-indexes corresponding to the respective sets of carriers of the user equipment; and A third power control command transmitting module 602 is configured to map an uplink TPC command corresponding to each set of carriers into a corresponding location in a PDCCH using the DCI format 3/3A according to the TPC-index corresponding to the set of carriers, to scramble the PDCCH with the TPC-RNTI corresponding to the set of carriers, and to transmit the PDCCH in a common search space of a PCC of the user equipment.

Preferably further to the embodiment of the network-side device illustrated in FIG. 6, the third parameter determining module 601 configured to determine the TPC-RNTIs corresponding to the respective sets of carriers of the user equipment is configured:

To determine a TPC-RNTI corresponding to the user equipment as predefined with the user equipment, or to determine a TPC-RNTI corresponding to the user equipment, and to configure the user equipment with the TPC-RNTI in higher-layer signaling, where the TPC-RNTI corresponding to the user equipment is used as the TPC-RNTI corresponding to each set of carriers of the user equipment; and The third parameter determining module 601 configured to determine the TPC-indexes corresponding to the respective sets of carriers of the user equipment is configured:

To determine the TPC-indexes corresponding to the respective sets of carriers of the user equipment as predefined with the user equipment, or to determine the TPC-indexes corresponding to the respective sets of carriers of the user equipment, and to configure the user equipment with the TPC-indexes in higher-layer signaling, where TPC-indexes corresponding to different sets of carriers are different from each other; or To determine a TPC-index corresponding to the user equipment, and TPC-index-offsets corresponding to the respective sets of carriers of the user equipment as predefined with the user equipment, or to determine a TPC-index corresponding to the user equipment, and TPC-index-offsets corresponding to the respective sets of carriers of the user equipment, and to configure the user equipment with the TPC-index and the TPC-index-offsets in higher-layer signaling; and to determine the TPC-indexes corresponding to the respective sets of carriers of the user equipment according to the TPC-index corresponding to the user equipment, and the TPC-index-offsets corresponding to the respective sets of carriers of the user equipment, where TPC-indexes corresponding to different sets of carriers are different from each other.

Preferably further to the embodiment of the network-side device illustrated in FIG. 6, the third parameter determining module 601 configured to determine the TPC-RNTIs corresponding to the respective sets of carriers of the user equipment is configured:

To determine the TPC-RNTIs corresponding to the respective sets of carriers of the user equipment as predefined with the user equipment, or to determine the TPC-RNTIs corresponding to the respective sets of carriers of the user equipment, and to configure the user equipment with the TPC-RNTIs in higher-layer signaling, where TPC-RNTIs corresponding to different sets of carriers are different from each other; and The third parameter determining module 601 configured to determine the TPC-indexes corresponding to the respective sets of carriers of the user equipment is configured:

To determine a TPC-index corresponding to the user equipment as predefined with the user equipment, or to determine a TPC-index corresponding to the user equipment, and to configure the user equipment with the TPC-index in higher-layer signaling, where the TPC-index corresponding to the user equipment is used as the TPC-index corresponding to each set of carriers of the user equipment; or To determine the TPC-indexes corresponding to the respective sets of carriers of the user equipment as predefined with the user equipment; or To determine the TPC-indexes corresponding to the respective sets of carriers of the user equipment, and to configure the user equipment with the TPC-indexes in higher-layer signaling; or To determine a TPC-index corresponding to the user equipment, and TPC-index-offsets corresponding to the respective sets of carriers of the user equipment as predefined with the user equipment, or to determine a TPC-index corresponding to the user equipment, and TPC-index-offsets corresponding to the respective sets of carriers of the user equipment, and to configure the user equipment with the TPC-index and the TPC-index-offsets in higher-layer signaling; and to determine the TPC-indexes corresponding to the respective sets of carriers of the user equipment according to the TPC-index corresponding to the user equipment, and the TPC-index-offsets corresponding to the respective sets of carriers.

Preferably further to the embodiment of the network-side device illustrated in FIG. 6, the third parameter determining module 601 configured to determine the TPC-RNTIs corresponding to the respective sets of carriers of the user equipment is configured:

To determine the TPC-RNTIs corresponding to the respective sets of carriers of the user equipment as predefined with the user equipment, or to determine the TPC-RNTIs corresponding to the respective sets of carriers, and to configure the user equipment with the TPC-RNTIs in higher-layer signaling, where not all of the TPC-RNTIs corresponding to the respective sets of carriers are the same; and The third parameter determining module configured to determine the TPC-indexes corresponding to the respective sets of carriers of the user equipment is configured:

To determine the TPC-indexes corresponding to the respective sets of carriers of the user equipment as predefined with the user equipment, or to determine the TPC-indexes corresponding to the respective sets of carriers of the user equipment, and to configure the user equipment with the TPC-indexes in higher-layer signaling, where TPC-indexes corresponding to sets of carriers corresponding to the same TPC-RNTI are different from each other; or To determine a TPC-index corresponding to the user equipment, and TPC-index-offsets corresponding to the respective sets of carriers of the user equipment as predefined with the user equipment, or to determine a TPC-index corresponding to the user equipment, and TPC-index-offsets corresponding to the respective sets of carriers of the user equipment, and to configure the user equipment with the TPC-index and the TPC-index-offsets in higher-layer signaling; and to determine the TPC-indexes corresponding to the respective sets of carriers of the user equipment according to the TPC-index corresponding to the user equipment, and the TPC-index-offsets corresponding to the respective sets of carriers of the user equipment, where TPC-indexes corresponding to sets of carriers corresponding to the same TPC-RNTI are different from each other.

Preferably further to the respective embodiments of the network-side device illustrated in FIG. 6, the third power control command transmitting module 602 is configured:

To map the uplink TPC commands corresponding to the sets of carriers of the user equipment corresponding to different TPC-RNTIs into multiple PDCCHs using the DCI format 3/3A and scrambled with the corresponding different TPC-RNTIs respectively, and to transmit the plurality of PDCCHs in the common search space of the PCC of the user equipment respectively in different downlink sub-frames.

Preferably further to the respective embodiments of the network-side device illustrated in FIG. 6, the third power control command transmitting module 602 is configured:

To map the uplink TPC commands corresponding to the sets of carriers of the user equipment with the same TPC-RNTI into the same PDCCH using the DCI format 3/3A and scrambled with the same TPC-RNTI, and to transmit the PDCCH in the common search space of the PCC of the user equipment.

Preferably further to the respective embodiments of the network-side device illustrated in FIG. 6, the third power control command transmitting module 602 is configured:

To map uplink TPC commands corresponding to sets of carriers with the same TPC-RNTI of different user equipments into the same PDCCH using the DCI format 3/3A and scrambled with the same TPC-RNTI, and to transmit the PDCCH in the common search space of the PCC of the user equipment.

Figure 7:
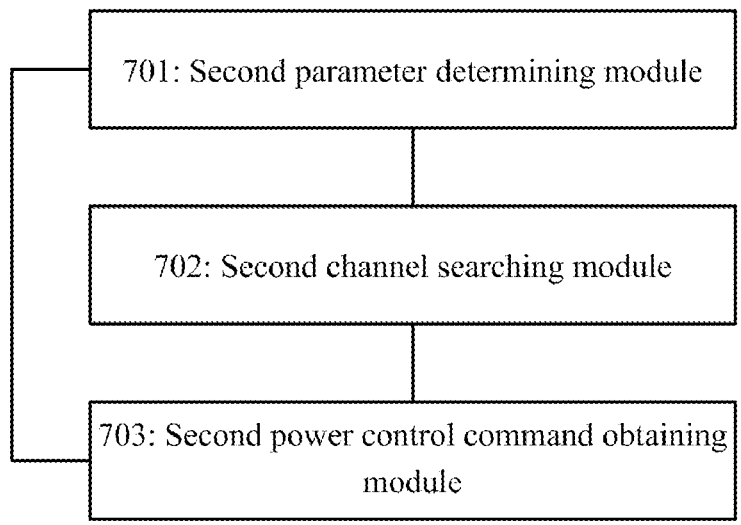
FIG. 7 illustrates a schematic structural diagram of a UE according to embodiments of the second implementation of the invention.

For the second implementation of transmitting an uplink TPC command according to the embodiments of the invention, an embodiment of the invention further a user equipment structured as illustrated in FIG. 7, and a particular implementation structure thereof includes:

A second parameter determining module 701 is configured to determine TPC-RNTIs corresponding to respective sets of carriers and TPC-indexes corresponding to the respective sets of carriers;

A second channel searching module 702 is configured to detect PDCCHs using the DCI format 3/3A and scrambled with the TPC-RNTIs corresponding to the respective sets of carriers in common search spaces of search carriers corresponding to the respective sets of carriers respectively, where the search carrier corresponding to each set of carriers is such a carrier in the set of carriers that is preconfigured in higher-layer signaling or predefined with the network side; and A second power control command obtaining module 703 is configured to determine the locations, of uplink TPC commands corresponding to the respective sets of carriers, in the PDCCHs detected on the search carriers corresponding to the sets of carriers according to the TPC-indexes corresponding to the sets of carriers respectively, and to obtain the uplink TPC commands corresponding to the sets of carriers at the corresponding locations.

Preferably the second parameter determining module 701 configured to determine the TPC-RNTIs corresponding to the respective sets of carriers is configured:

To determine a TPC-RNTI corresponding to the user equipment as indicated by higher-layer signaling or as predefined with the network side, where the TPC-RNTI corresponding to the user equipment is used as the TPC-RNTI corresponding to each set of carriers of the user equipment; and The second parameter determining module 701 configured to the TPC-indexes corresponding to the respective sets of carriers is configured:

To determine a TPC-index corresponding to the user equipment as indicated by higher-layer signaling or as predefined with the network side, where the TPC-index corresponding to the user equipment is used as the TPC-index corresponding to each set of carriers of the user equipment; or To determine the TPC-indexes corresponding to the respective sets of carriers as indicated by higher-layer signaling or as predefined with the network side; or To determine a TPC index corresponding to the user equipment, and TPC-index-offsets corresponding to the respective sets of carriers as indicated by higher-layer signaling or as predefined with the network side, and to determine the TPC-indexes corresponding to the respective sets of carriers according to the TPC-index corresponding to the user equipment, and the TPC-index-offsets corresponding to the respective sets of carriers.

Preferably further to the respective embodiments of the user equipment illustrated in FIG. 7, the search carrier corresponding to each set of carriers can be a downlink carrier, in the set of carriers, paired with an uplink carrier, corresponding to the set of carriers, on which uplink control information is transmitted; or a downlink PCC in the set of carriers.

Figure 8:
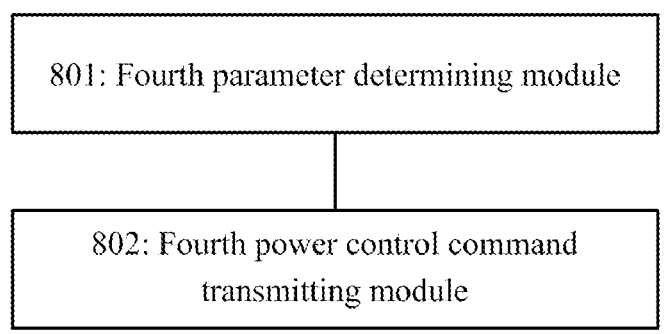
FIG. 8 illustrates a schematic structural diagram of a network-side device according to embodiments of the second implementation of the invention.

For the second implementation of transmitting an uplink TPC command according to the embodiments of the invention, an embodiment of the invention further provides a network-side device structured as illustrated in FIG. 8, and a particular implementation structure thereof includes:

A fourth parameter determining module 801 is configured to determine TPC-RNTIs corresponding to respective sets of carriers of a user equipment and TPC-indexes corresponding to the respective sets of carriers of the user equipment; and A fourth power control command transmitting module 802 is configured to map an uplink TPC command corresponding to each set of carriers into a corresponding location in a PDCCH using the DCI format 3/3A according to the TPC-index of the set of carriers, to scramble the PDCCH with the TPC-RNTI corresponding to the set of carriers, and to transmit the PDCCH in a common search space of a search carrier corresponding to the set of carriers of the user equipment, where the search carrier corresponding to each set of carriers is such a carrier in the set of carriers that is preconfigured in higher-layer signaling or predefined with the user equipment.

Preferably the fourth parameter determining module 801 configured to determine the TPC-RNTIs corresponding to the respective sets of carriers of the user equipment is configured:

To determine a TPC-RNTI corresponding to the user equipment as predefined with the user equipment, or to determine a TPC-RNTI corresponding to the user equipment, and to configure the user equipment with the TPC-RNTI in higher-layer signaling, where the TPC-RNTI corresponding to the user equipment is used as the TPC-RNTI corresponding to each set of carriers of the user equipment; and The fourth parameter determining module 801 configured to determine the TPC-indexes corresponding to the respective sets of carriers of the user equipment is configured:

To determine a TPC-index corresponding to the user equipment as predefined with the user equipment, or to determine a TPC-index corresponding to the user equipment, and to configure the user equipment with the TPC-index in higher-layer signaling, where the TPC-index corresponding to the user equipment is used as the TPC-index corresponding to each set of carriers of the user equipment; or To determine the TPC-indexes corresponding to the respective sets of carriers as predefined with the user equipment; or To determine the TPC-indexes corresponding to the respective sets of carriers, and to configure the user equipment with the TPC-indexes in higher-layer signaling; or To determine a TPC index corresponding to the user equipment, and TPC-index-offsets corresponding to the respective sets of carriers as predefined with the user equipment; or to determine a TPC index corresponding to the user equipment, and TPC-index-offsets corresponding to the respective sets of carriers, and to configure the user equipment with the TPC index and the TPC-index-offsets in higher-layer signaling; and to determine the TPC-indexes corresponding to the respective sets of carriers according to the TPC-index corresponding to the user equipment, and the TPC-index-offsets corresponding to the respective sets of carriers.

Preferably further to the respective embodiments of the network-side device illustrated in FIG. 8, the fourth power control command transmitting module 802 is further configured:

For each set of carriers, to map uplink TPC commands of multiple user equipments with the same TPC-RNTI in the set of carriers, into a PDCCH using the DCI format 3/3A and scrambled with the said same TPC-RNTI, and to transmit the PDCCH in the common search space of the search carrier corresponding to the same set of carriers.

Preferably further to the respective embodiments of the network-side device illustrated in FIG. 8, the search carrier corresponding to each set of carriers is a downlink carrier, in the set of carriers, paired with an uplink carrier, corresponding to the set of carriers, on which uplink control information is transmitted; or a downlink PCC in the set of carriers.

In the embodiments above of the invention, the TPC-RNTI can be a TPC-Physical Uplink Control Channel (PUCCH)-RNTI or a TPC-Physical Uplink Shared Channel (PUSCH)/SRS-RNTI.

If the TPC-RNTI is the TPC-PUCCH-RNTI, the corresponding uplink TPC command is an uplink TPC command for a PUCCH.

If the TPC-RNTI is the TPC-PUSCH-RNTI, the corresponding uplink TPC command is an uplink TPC command for a PUSCH/SRS.

In the embodiments above of the invention, the network-side device transmitting an uplink TPC command can be an eNB or, of course, can be another network-side device capable of transmitting control signaling.

Figure 9:
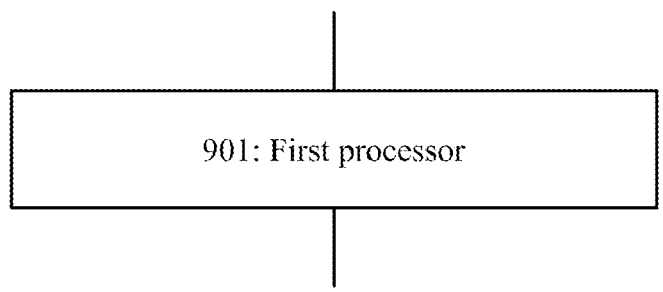
FIG. 9 illustrates a schematic physically structural diagram of a UE according to embodiments of the first implementation of the invention.

Referring to FIG. 9, a user equipment according to an embodiment of the invention includes a first processor 901, where:

The first processor 901 is configured to determine transmit power control-radio network temporary identifiers corresponding to respective sets of carriers and transmit power control-indexes corresponding to the respective sets of carriers; to detect physical downlink control channels using the downlink control information format 3/3A and scrambled with the transmit power control-radio network temporary identifiers corresponding to the respective sets of carriers in a common search space of a primary component carrier; and to determine the locations, of uplink transmit power control commands corresponding to the respective sets of carriers, in the detected physical downlink control channels scrambled with the transmit power control-radio network temporary identifiers corresponding to the sets of carriers according to the transmit power control-indexes corresponding to the sets of carriers, and to obtain the uplink transmit power control commands corresponding to the respective sets of carriers at the corresponding locations.

The first processor 901 is configured to determine the transmit power control-radio network temporary identifiers corresponding to the respective sets of carriers and the transmit power control-indexes corresponding to the respective sets of carriers in any one of the following approaches:

A first approach where:

(The first processor is configured to determine a transmit power control-radio network temporary identifier corresponding to the user equipment as indicated by higher-layer signaling or as predefined with the network side, where the transmit power control-radio network temporary identifier corresponding to the user equipment is used as the transmit power control-radio network temporary identifier corresponding to each set of carriers of the user equipment;) and (To determine the transmit power control-indexes corresponding to the respective sets of carriers as indicated by higher-layer signaling or as predefined with the network side, where transmit power control-indexes corresponding to different sets of carriers are different from each other; or To determine a transmit power control-index corresponding to the user equipment, and transmit power control-index-offsets corresponding to the respective sets of carriers as indicated by higher-layer signaling or as predefined with the network side, and to determine the transmit power control-indexes corresponding to the respective sets of carriers according to the transmit power control-index corresponding to the user equipment, and the transmit power control-index-offsets corresponding to the respective sets of carriers, where transmit power control-indexes corresponding to different sets of carriers are different from each other;)

A second approach where:

(The first processor is configured to determine the transmit power control-radio network temporary identifiers corresponding to the respective sets of carriers as indicated by higher-layer signaling or as predefined with the network side, where transmit power control-radio network temporary identifiers corresponding to different sets of carriers are different from each other;) and (To determine a transmit power control-index corresponding to the user equipment as indicated by higher-layer signaling or as predefined with the network side, where the transmit power control-index corresponding to the user equipment is a transmit power control-index corresponding to each set of carriers of the user equipment; or To determine the transmit power control-indexes corresponding to the respective sets of carriers as indicated by higher-layer signaling or as predefined with the network side; or To determine a transmit power control-index corresponding to the user equipment, and transmit power control-index-offsets corresponding to the respective sets of carriers as indicated by higher-layer signaling or as predefined with the network side, and to determine the transmit power control-indexes corresponding to the respective sets of carriers according to the transmit power control-index corresponding to the user equipment, and the transmit power control-index-offsets corresponding to the respective sets of carriers;)

A third approach where:

(The first processor is configured to determine the transmit power control-radio network temporary identifiers corresponding to the respective sets of carriers as indicated by higher-layer signaling or as predefined with the network side, where not all of transmit power control-radio network temporary identifiers corresponding to different sets of carriers are the same;) and (To determine the transmit power control-indexes corresponding to the respective sets of carriers as indicated by higher-layer signaling or as predefined with the network side, where sets of carriers corresponding to the same transmit power control-radio network temporary identifier correspond to different transmit power control-indexes; or To determine a transmit power control-index corresponding to the user equipment, and transmit power control-index-offsets corresponding to the respective sets of carriers as indicated by higher-layer signaling or as predefined with the network side, and to determine the transmit power control-indexes corresponding to the respective sets of carriers according to the transmit power control-index corresponding to the user equipment, and the transmit power control-index-offsets corresponding to the respective sets of carriers, where sets of carriers corresponding to the same transmit power control-radio network temporary identifier correspond to different transmit power control-indexes.)

In the first approach or the third approach, the first processor 901 is configured:

When a plurality of sets of carriers of the user equipment correspond to the same transmit power control-radio network temporary identifier, to determine the locations, of the uplink transmit power control commands corresponding to the respective sets of carriers, in the detected physical downlink control channel scrambled with the transmit power control-radio network temporary identifier according to the transmit power control-indexes corresponding to the respective sets of carriers with the same transmit power control-radio network temporary identifier respectively, and to obtain the uplink transmit power control commands corresponding to the respective sets of carriers at the corresponding locations.

The transmit power control-radio network temporary identifier includes a transmit power control-physical uplink control channel-radio network temporary identifier or a transmit power control-physical uplink shared channel-radio network temporary identifier.

Figure 10:
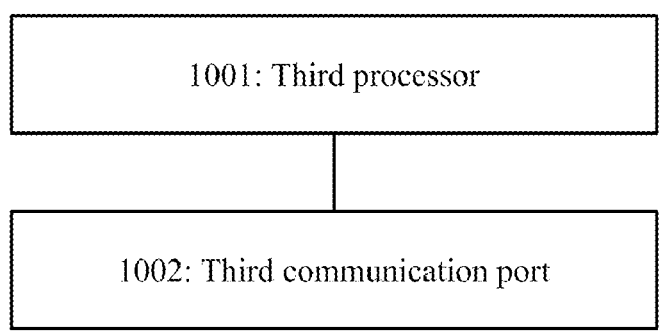
FIG. 10 illustrates a schematic physically structural diagram of a network-side device according to embodiments of the first implementation of the invention.

Referring to FIG. 10, a network-side device according to an embodiment of the invention includes a third processor 1001 and a third communication port 1002, where:

The third processor 1001 is configured to determine transmit power control-radio network temporary identifiers corresponding to respective sets of carriers of a user equipment and transmit power control-indexes corresponding to the respective sets of carriers of the user equipment; and The third communication port 1002 is configured to map an uplink transmit power control command corresponding to each set of carriers into a corresponding location in a physical downlink control channel using the downlink control information format 3/3A according to the transmit power control-index corresponding to the set of carriers, to scramble the physical downlink control channel with the transmit power control-radio network temporary identifier corresponding to the set of carriers, and to transmit the physical downlink control channel in a common search space of a primary component carrier of the user equipment.

The third processor 1001 is configured to determine the transmit power control-radio network temporary identifiers corresponding to the respective sets of carriers of the user equipment and the transmit power control-indexes corresponding to the respective sets of carriers of the user equipment in any one of the following approaches:

A first approach where:

(The third processor is configured to determine a transmit power control-radio network temporary identifier corresponding to the user equipment as predefined with the user equipment, or to determine a transmit power control-radio network temporary identifier corresponding to the user equipment, and to configure the user equipment with the transmit power control-radio network temporary identifier in higher-layer signaling, where the transmit power control-radio network temporary identifier corresponding to the user equipment is used as the transmit power control-radio network temporary identifier corresponding to each set of carriers of the user equipment;) and (To determine the transmit power control-indexes corresponding to the respective sets of carriers of the user equipment as predefined with the user equipment, or to determine the transmit power control-indexes corresponding to the respective sets of carriers of the user equipment, and to configure the user equipment with the transmit power control-indexes in higher-layer signaling, where transmit power control-indexes corresponding to different sets of carriers are different from each other; or To determine a transmit power control-index corresponding to the user equipment, and transmit power control-index-offsets corresponding to the respective sets of carriers of the user equipment as predefined with the user equipment; or To determine a transmit power control-index corresponding to the user equipment, and transmit power control-index-offsets corresponding to the respective sets of carriers of the user equipment, and to configure the user equipment with the transmit power control-index and the transmit power control-index-offsets in higher-layer signaling; and to determine the transmit power control-indexes corresponding to the respective sets of carriers of the user equipment according to the transmit power control-index corresponding to the user equipment, and the transmit power control-index-offsets corresponding to the respective sets of carriers of the user equipment, where transmit power control-indexes corresponding to different sets of carriers are different from each other;)

A second approach where:

(The third processor is configured to determine the transmit power control-radio network temporary identifiers corresponding to the respective sets of carriers of the user equipment as predefined with the user equipment, or to determine the transmit power control-radio network temporary identifiers corresponding to the respective sets of carriers of the user equipment, and to configure the user equipment with the transmit power control-radio network temporary identifiers in higher-layer signaling, where transmit power control-radio network temporary identifiers corresponding to different sets of carriers are different from each other;) and (To determine a transmit power control-index corresponding to the user equipment as predefined with the user equipment, or to determine a transmit power control-index corresponding to the user equipment, and to configure the user equipment with the transmit power control-index in higher-layer signaling, where the transmit power control-index corresponding to the user equipment is used as the transmit power control-index corresponding to each set of carriers of the user equipment; or To determine the transmit power control-indexes corresponding to the respective sets of carriers of the user equipment as predefined with the user equipment; or To determine the transmit power control-indexes corresponding to the respective sets of carriers of the user equipment, and to configure the user equipment with the transmit power control-indexes in higher-layer signaling; or To determine a transmit power control-index corresponding to the user equipment, and transmit power control-index-offsets corresponding to the respective sets of carriers of the user equipment as predefined with the user equipment, or to determine a transmit power control-index corresponding to the user equipment, and transmit power control-index-offsets corresponding to the respective sets of carriers of the user equipment, and to configure the user equipment with the transmit power control-index and the transmit power control-index-offsets in higher-layer signaling; and to determine the transmit power control-indexes corresponding to the respective sets of carriers of the user equipment according to the transmit power control-index corresponding to the user equipment, and the transmit power control-index-offsets corresponding to the respective sets of carriers;) and A third approach where:

(The third processor is configured to determine the transmit power control-radio network temporary identifiers corresponding to the respective sets of carriers of the user equipment as predefined with the user equipment, or to determine the transmit power control-radio network temporary identifiers corresponding to the respective sets of carriers of the user equipment, and to configure the user equipment with the transmit power control-radio network temporary identifiers in higher-layer signaling, where not all of the transmit power control-radio network temporary identifiers corresponding to the respective sets of carriers are the same;) and (To determine the transmit power control-indexes corresponding to the respective sets of carriers of the user equipment as predefined with the user equipment, or to determine the transmit power control-indexes corresponding to the respective sets of carriers of the user equipment, and to configure the user equipment with the transmit power control-indexes in higher-layer signaling, where transmit power control-indexes corresponding to sets of carriers corresponding to the same transmit power control-radio network temporary identifier are different from each other; or To determine a transmit power control-index corresponding to the user equipment, and transmit power control-index-offsets corresponding to the respective sets of carriers of the user equipment as predefined with the user equipment, or to determine a transmit power control-index corresponding to the user equipment, and transmit power control-index-offsets corresponding to the respective sets of carriers of the user equipment, and to configure the user equipment with the transmit power control-index and the transmit power control-index-offsets in higher-layer signaling; and to determine the transmit power control-indexes corresponding to the respective sets of carriers of the user equipment according to the transmit power control-index corresponding to the user equipment, and the transmit power control-index-offsets corresponding to the respective sets of carriers of the user equipment, where transmit power control-indexes corresponding to sets of carriers corresponding to the same transmit power control-radio network temporary identifier are different from each other.)

In the second approach or the third approach, the third communication port 1002 is configured:

To map the uplink transmit power control commands corresponding to the sets of carriers of the user equipment corresponding to different transmit power control-radio network temporary identifiers into multiple physical downlink control channels using the downlink control information format 3/3A and scrambled with the corresponding different transmit power control-radio network temporary identifiers respectively, and to transmit the plurality of physical downlink control channels in the common search space of the primary component carrier of the user equipment respectively in different downlink sub-frames;

Or

In the first approach or the third approach, the third communication port 1002 is configured:

To map the uplink transmit power control commands corresponding to the sets of carriers of the user equipment with the same transmit power control-radio network temporary identifier into the same physical downlink control channel using the downlink control information format 3/3A and scrambled with the same transmit power control-radio network temporary identifier, and to transmit the physical downlink control channel in the common search space of the primary component carrier of the user equipment;

Or

The third communication port 1002 is configured to map uplink transmit power control commands corresponding to sets of carriers with the same transmit power control-radio network temporary identifier of different user equipments into the same physical downlink control channel using the downlink control information format 3/3A and scrambled with the same transmit power control-radio network temporary identifier, and to transmit the physical downlink control channel in the common search space of the primary component carrier of the user equipment.

The transmit power control-radio network temporary identifier includes a transmit power control-physical uplink control channel-radio network temporary identifier or a transmit power control-physical uplink shared channel-radio network temporary identifier.

Figure 11:
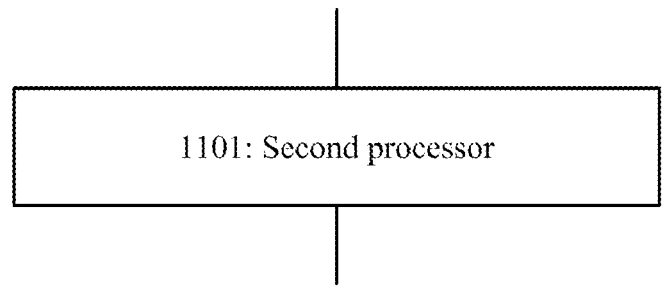
FIG. 11 illustrates a schematic physically structural diagram of a UE according to embodiments of the second implementation of the invention.

Referring to FIG. 11, a user equipment according to an embodiment of the invention includes a second processor 1101, where:

The second processor 1101 is configured to determine transmit power control-radio network temporary identifiers corresponding to respective sets of carriers and transmit power control-indexes corresponding to the respective sets of carriers; to detect physical downlink control channels using the downlink control information format 3/3A and scrambled with the transmit power control-radio network temporary identifiers corresponding to the respective sets of carriers in common search spaces of search carriers corresponding to the respective sets of carriers respectively, where the search carrier corresponding to each set of carriers is such a carrier in the set of carriers that is preconfigured in higher-layer signaling or predefined with the network side; and to determine the locations, of uplink transmit power control commands corresponding to the respective sets of carriers, in the physical downlink control channels detected on the search carriers corresponding to the sets of carriers according to the transmit power control-indexes corresponding to the sets of carriers respectively, and to obtain the uplink transmit power control commands corresponding to the sets of carriers at the corresponding locations.

The second processor 1101 configured to determine the transmit power control-radio network temporary identifiers corresponding to the respective sets of carriers and the transmit power control-indexes corresponding to the respective sets of carriers is configured:

(To determine a transmit power control-radio network temporary identifier corresponding to the user equipment as indicated by higher-layer signaling or as predefined with the network side, where the transmit power control-radio network temporary identifier corresponding to the user equipment is used as the transmit power control-radio network temporary identifier corresponding to each set of carriers of the user equipment;) and (To determine a transmit power control-index corresponding to the user equipment as indicated by higher-layer signaling or as predefined with the network side, where the transmit power control-index corresponding to the user equipment is a transmit power control-index corresponding to each set of carriers of the user equipment; or To determine the transmit power control-indexes corresponding to the respective sets of carriers as indicated by higher-layer signaling or as predefined with the network side; or To determine a transmit power control index corresponding to the user equipment, and transmit power control-index-offsets corresponding to the respective sets of carriers as indicated by higher-layer signaling or as predefined with the network side, and to determine the transmit power control-indexes corresponding to the respective sets of carriers according to the transmit power control-index corresponding to the user equipment, and the transmit power control-index-offsets corresponding to the respective sets of carriers.)

The search carrier corresponding to each set of carriers is:

A downlink carrier, in the set of carriers, paired with an uplink carrier, corresponding to the set of carriers, on which uplink control information is transmitted;

Or

A downlink primary component carrier in the set of carriers.

The transmit power control-radio network temporary identifier is a transmit power control-physical uplink control channel-radio network temporary identifier; or the transmit power control-radio network temporary identifier is a transmit power control-physical uplink shared channel-radio network temporary identifier.

Figure 12:
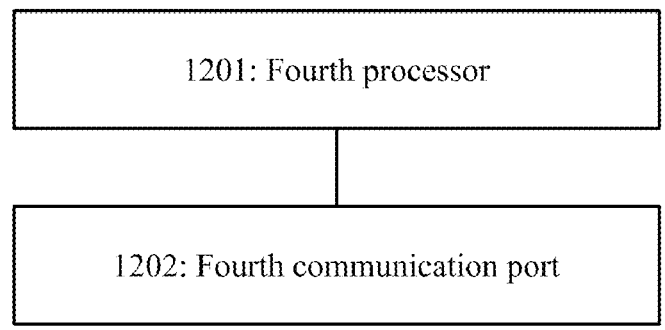
FIG. 12 illustrates a schematic physically structural diagram of a network-side device according to embodiments of the second implementation of the invention.

Referring to FIG. 12, a network-side device according to an embodiment of the invention includes a fourth processor 1201 and a fourth communication port 1202, where:

The fourth processor 1201 is configured to determine transmit power control-radio network temporary identifiers corresponding to respective sets of carriers of a user equipment and transmit power control-indexes corresponding to the respective sets of carriers of the user equipment; and The fourth communication port 1202 is configured to map an uplink transmit power control command corresponding to each set of carriers into a corresponding location in a physical downlink control channel using the downlink control information format 3/3A according to the transmit power control-index of the set of carriers, to scramble the physical downlink control channel with the transmit power control-radio network temporary identifier corresponding to the set of carriers, and to transmit the physical downlink control channel in a common search space of a search carrier corresponding to the set of carriers of the user equipment, where the search carrier corresponding to each set of carriers is such a carrier in the set of carriers that is preconfigured in higher-layer signaling or predefined with the user equipment.

The fourth processor 1201 configured to determine the transmit power control-radio network temporary identifiers corresponding to the respective sets of carriers of the user equipment and the transmit power control-indexes corresponding to the respective sets of carriers of the user equipment is configured:

(To determine a transmit power control-radio network temporary identifier corresponding to the user equipment as predefined with the user equipment, or to determine a transmit power control-radio network temporary identifier corresponding to the user equipment, and to configure the user equipment with the transmit power control-radio network temporary identifier in higher-layer signaling, where the transmit power control-radio network temporary identifier corresponding to the user equipment is used as the transmit power control-radio network temporary identifier corresponding to each set of carriers of the user equipment;) and (To determine a transmit power control-index corresponding to the user equipment as predefined with the user equipment, or to determine a transmit power control-index corresponding to the user equipment, and to configure the user equipment with the transmit power control-index in higher-layer signaling, where the transmit power control-index corresponding to the user equipment is used as the transmit power control-index corresponding to each set of carriers of the user equipment; or To determine the transmit power control-indexes corresponding to the respective sets of carriers as predefined with the user equipment; or To determine the transmit power control-indexes corresponding to the respective sets of carriers, and to configure the user equipment with the transmit power control-indexes in higher-layer signaling; or To determine a transmit power control index corresponding to the user equipment, and transmit power control-index-offsets corresponding to the respective sets of carriers as predefined with the user equipment; or to determine a transmit power control index corresponding to the user equipment, and transmit power control-index-offsets corresponding to the respective sets of carriers, and to configure the user equipment with the transmit power control index and the transmit power control-index-offsets in higher-layer signaling; and to determine the transmit power control-indexes corresponding to the respective sets of carriers according to the transmit power control-index corresponding to the user equipment, and the transmit power control-index-offsets corresponding to the respective sets of carriers.)

The fourth communication port 1202 is further configured:

For each set of carriers, to map uplink transmit power control commands of multiple user equipments with the same transmit power control-radio network temporary identifier in the set of carriers, into the same physical downlink control channel using the downlink control information format 3/3A and scrambled with the said same transmit power control-radio network temporary identifier, and to transmit the physical downlink control channel in the common search space of the search carrier corresponding to the set of carriers.

The search carrier corresponding to each set of carriers is:

A downlink carrier, in the set of carriers, paired with an uplink carrier, corresponding to the set of carriers, on which uplink control information is transmitted;

Or

A downlink primary component carrier in the set of carriers.

The transmit power control-radio network temporary identifier is a transmit power control-physical uplink control channel-radio network temporary identifier; or the transmit power control-radio network temporary identifier is a transmit power control-physical uplink shared channel-radio network temporary identifier.

It shall be appreciated that the technical solutions according to the invention can be applicable to various communication systems, e.g., a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a Universal Mobile Telecommunication System (UMTS), etc.

It shall be further appreciated that tin the embodiments of the invention, the UE includes but will not be limited to a Mobile Station (MS), a mobile terminal, a mobile telephone, a handset, a portable equipment, etc., and the user equipment can communicate with one or more core networks over a Radio Access Network (RAN), for example, the user equipment can be a mobile telephone (or referred to as a "cellular" phone), a computer capable of wireless communication, etc., and the user equipment can also be a portable, pocket-held, handheld, embedded-in-computer or on-vehicle mobile device.

In the embodiments of the invention, the base station (e.g., an access point) can refer to a device, in an access network, communicating with a wireless terminal via an air interface in one or more sectors. The base station can be configured to convert a received air frame into an IP frame or vice versa and can function as a router between the wireless terminal and other part of the access network, where the other part of the access network includes an Internet Protocol (IP) network. The base station can further coordinate attribute management on the air interface. For example, the base station can be a Base Transceiver Station (BTS) in a GSM or CDMA system, or can also be a base station (a Node B) in a WCDMA system, or can further be an evolved base station (a Node B or an eNB or an e-Node B (an evolved Node B)) in an LTE system, although the invention will not be limited thereto.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting an uplink power control command, the method comprising:
  determining transmit power control-radio network temporary identifiers corresponding to respective sets of carriers and transmit power control-indexes corresponding to the respective sets of carriers, wherein Physical Uplink Control Channels are transmitted on different uplink carriers corresponding to different sets of carriers;

detecting physical downlink control channels using the downlink control information format 3/3A and scrambled with the transmit power control-radio network temporary identifiers corresponding to the respective sets of carriers in a common search space of a primary component carrier; and determining the locations, of uplink transmit power control commands corresponding to the respective sets of carriers, in the detected physical downlink control channels scrambled with the transmit power control-radio network temporary identifiers corresponding to the sets of carriers according to the transmit power control-indexes corresponding to the sets of carriers, and obtaining the uplink transmit power control commands corresponding to the sets of carriers at the corresponding locations.

2. The method according to claim 1, wherein determining the transmit power control-radio network temporary identifiers corresponding to the respective sets of carriers and the transmit power control-indexes corresponding to the respective sets of carriers comprises any one of the following approaches:

a first approach where:

determining a transmit power control-radio network temporary identifier corresponding to the user equipment as indicated by higher-layer signaling or as predefined with the network side, wherein the transmit power control-radio network temporary identifier corresponding to the user equipment is used as the transmit power control-radio network temporary identifier corresponding to each set of carriers of the user equipment; and determining the transmit power control-indexes corresponding to the respective sets of carriers as indicated by higher-layer signaling or as predefined with the network side, wherein transmit power control-indexes corresponding to different sets of carriers are different from each other; or determining a transmit power control-index corresponding to the user equipment, and transmit power control-index-offsets corresponding to the respective sets of carriers as indicated by higher-layer signaling or as predefined with the network side, and determining the transmit power control-indexes corresponding to the respective sets of carriers according to the transmit power control-index corresponding to the user equipment, and the transmit power control-index-offsets corresponding to the respective sets of carriers, wherein transmit power control-indexes corresponding to different sets of carriers are different from each other;

a second approach where:

determining the transmit power control-radio network temporary identifiers corresponding to the respective sets of carriers as indicated by higher-layer signaling or as predefined with the network side, wherein transmit power control-radio network temporary identifiers corresponding to different sets of carriers are different from each other; and determining a transmit power control-index corresponding to the user equipment as indicated by higher-layer signaling or as predefined with the network side, wherein the transmit power control-index corresponding to the user equipment is used as the transmit power control-index corresponding to each set of carriers of the user equipment; or determining the transmit power control-indexes corresponding to the respective sets of carriers as indicated by higher-layer signaling or as predefined with the network side; or determining a transmit power control-index corresponding to the user equipment, and transmit power control-index-offsets corresponding to the respective sets of carriers as indicated by higher-layer signaling or as predefined with the network side, and determining the transmit power control-indexes corresponding to the respective sets of carriers according to the transmit power control-index corresponding to the user equipment, and the transmit power control-index-offsets corresponding to the respective sets of carriers;

a third approach where:

determining the transmit power control-radio network temporary identifiers corresponding to the respective sets of carriers as indicated by higher-layer signaling or as predefined with the network side, wherein not all of transmit power control-radio network temporary identifiers corresponding to different sets of carriers are the same; and determining the transmit power control-indexes corresponding to the respective sets of carriers as indicated by higher-layer signaling or as predefined with the network side, wherein sets of carriers corresponding to the same transmit power control-radio network temporary identifier correspond to different transmit power control-indexes; or determining a transmit power control-index corresponding to the user equipment, and transmit power control-index-offsets corresponding to the respective sets of carriers as indicated by higher-layer signaling or as predefined with the network side, and determining the transmit power control-indexes corresponding to the respective sets of carriers according to the transmit power control-index corresponding to the user equipment, and the transmit power control-index-offsets corresponding to the respective sets of carriers, wherein sets of carriers corresponding to the same transmit power control-radio network temporary identifier correspond to different transmit power control-indexes.

3. The method according to claim 2, wherein in the first approach or the third approach, determining the locations, of the uplink transmit power control commands corresponding to the respective sets of carriers, in the detected physical downlink control channels scrambled with the transmit power control-radio network temporary identifiers corresponding to the sets of carriers according to the transmit power control-indexes corresponding to the sets of carriers, and obtaining the uplink transmit power control commands corresponding to the sets of carriers at the corresponding locations comprises:

when a plurality of sets of carriers of the user equipment correspond to the same transmit power control-radio network temporary identifier, determining the locations, of the uplink transmit power control commands corresponding to the respective sets of carriers, in the detected physical downlink control channel scrambled with the transmit power control-radio network temporary identifier according to the transmit power control-indexes corresponding to the respective sets of carriers with the same transmit power control-radio network temporary identifier respectively, and obtaining the uplink transmit power control commands corresponding to the respective sets of carriers at the corresponding locations.

4. The method according to claim 1, wherein the transmit power control-radio network temporary identifier comprises a transmit power control-physical uplink control channel-radio network temporary identifier or a transmit power control-physical uplink shared channel-radio network temporary identifier.

5. A method for transmitting an uplink power control command, the method comprising:
  determining transmit power control-radio network temporary identifiers corresponding to respective sets of carriers and transmit power control-indexes corresponding to the respective sets of carriers, wherein Physical Uplink Control Channels are transmitted on different uplink carriers corresponding to different sets of carriers;
  detecting physical downlink control channels using the downlink control information format 3/3A and scrambled with the transmit power control-radio network temporary identifiers corresponding to the respective sets of carriers in common search spaces of search carriers corresponding to the respective sets of carriers respectively, wherein the search carrier corresponding to each set of carriers is such a carrier in the set of carriers that is preconfigured in higher-layer signaling or predefined with the network side; and
  determining the locations, of uplink transmit power control commands corresponding to the respective sets of carriers, in the physical downlink control channels detected on the search carriers corresponding to the sets of carriers according to the transmit power control-indexes corresponding to the sets of carriers respectively, and obtaining the uplink transmit power control commands corresponding to the sets of carriers at the corresponding locations.

6. The method according to claim 5, wherein determining the transmit power control-radio network temporary identifiers corresponding to the respective sets of carriers and the transmit power control-indexes corresponding to the respective sets of carriers comprises:
  determining a transmit power control-radio network temporary identifier corresponding to the user equipment as indicated by higher-layer signaling or as predefined with the network side, wherein the transmit power control-radio network temporary identifier corresponding to the user equipment is used as the transmit power control-radio network temporary identifier corresponding to each set of carriers of the user equipment; and
  determining a transmit power control-index corresponding to the user equipment as indicated by higher-layer signaling or as predefined with the network side, wherein the transmit power control-index corresponding to the user equipment is used as the transmit power control-index corresponding to each set of carriers of the user equipment; or determining the transmit power control-indexes corresponding to the respective sets of carriers as indicated by higher-layer signaling or as predefined with the network side; or determining a transmit power control index corresponding to the user equipment, and transmit power control-index-offsets corresponding to the respective sets of carriers as indicated by higher-layer signaling or as predefined with the network side, and determining the transmit power control-indexes corresponding to the respective sets of carriers according to the transmit power control-index corresponding to the user equipment, and the transmit power control-index-offsets corresponding to the respective sets of carriers.

7. The method according to claim 5, wherein the search carrier corresponding to each set of carriers is:
  a downlink carrier, in the set of carriers, paired with an uplink carrier, corresponding to the set of carriers, on which uplink control information is transmitted;
  or
  a downlink primary component carrier in the set of carriers.

8. The method according to claim 5, wherein the transmit power control-radio network temporary identifier is a transmit power control-physical uplink control channel-radio network temporary identifier; or the transmit power control-radio network temporary identifier is a transmit power control-physical uplink shared channel-radio network temporary identifier.

9. A user equipment, comprising a memory configured to store computer readable instructions and a processor, wherein the processor executes the computer readable instructions to:
  determine transmit power control-radio network temporary identifiers corresponding to respective sets of carriers and transmit power control-indexes corresponding to the respective sets of carriers, wherein Physical Uplink Control Channels are transmitted on different uplink carriers corresponding to different sets of carriers;
  detect physical downlink control channels using the downlink control information format 3/3A and scrambled with the transmit power control-radio network temporary identifiers corresponding to the respective sets of carriers in a common search space of a primary component carrier; and
  determine the locations, of uplink transmit power control commands corresponding to the respective sets of carriers, in the detected physical downlink control channels scrambled with the transmit power control-radio network temporary identifiers corresponding to the sets of carriers according to the transmit power control-indexes corresponding to the sets of carriers, and obtain the uplink transmit power control commands corresponding to the sets of carriers at the corresponding locations.

10. The user equipment according to claim 9, wherein the processor executes the computer readable instructions to determine the transmit power control-radio network temporary identifiers corresponding to the respective sets of carriers and the transmit power control-indexes corresponding to the respective sets of carriers in any one of the following approaches:
  a first approach where:
    determining a transmit power control-radio network temporary identifier corresponding to the user equipment as indicated by higher-layer signaling or as predefined with the network side, wherein the transmit power control-radio network temporary identifier corresponding to the user equipment is used as the transmit power control-radio network temporary identifier corresponding to each set of carriers of the user equipment; and
    determining the transmit power control-indexes corresponding to the respective sets of carriers as indicated by higher-layer signaling or as predefined with the network side, wherein transmit power control-indexes corresponding to different sets of carriers are different from each other; or determining a transmit power control-index corresponding to the user equipment, and transmit power control-index-offsets corresponding to the respective sets of carriers as indicated by higher-layer signaling or as predefined with the network side, and determining the transmit power control-indexes corresponding to the respective sets of carriers according to the transmit power control-index corresponding to the user equipment, and the transmit power control-index-offsets corresponding to the respective sets of carriers, wherein transmit power control-indexes corresponding to different sets of carriers are different from each other;

a second approach where:

determining the transmit power control-radio network temporary identifiers corresponding to the respective sets of carriers as indicated by higher-layer signaling or as predefined with the network side, wherein transmit power control-radio network temporary identifiers corresponding to different sets of carriers are different from each other; and determining a transmit power control-index corresponding to the user equipment as indicated by higher-layer signaling or as predefined with the network side, wherein the transmit power control-index corresponding to the user equipment is a transmit power control-index corresponding to each set of carriers of the user equipment; or determining the transmit power control-indexes corresponding to the respective sets of carriers as indicated by higher-layer signaling or as predefined with the network side; or determining a transmit power control-index corresponding to the user equipment, and transmit power control-index-offsets corresponding to the respective sets of carriers as indicated by higher-layer signaling or as predefined with the network side, and determining the transmit power control-indexes corresponding to the respective sets of carriers according to the transmit power control-index corresponding to the user equipment, and the transmit power control-index-offsets corresponding to the respective sets of carriers;

a third approach where:

determining the transmit power control-radio network temporary identifiers corresponding to the respective sets of carriers as indicated by higher-layer signaling or as predefined with the network side, wherein not all of transmit power control-radio network temporary identifiers corresponding to different sets of carriers are the same; and determining the transmit power control-indexes corresponding to the respective sets of carriers as indicated by higher-layer signaling or as predefined with the network side, wherein sets of carriers corresponding to the same transmit power control-radio network temporary identifier correspond to different transmit power control-indexes; or determining a transmit power control-index corresponding to the user equipment, and transmit power control-index-offsets corresponding to the respective sets of carriers as indicated by higher-layer signaling or as predefined with the network side, and determining the transmit power control-indexes corresponding to the respective sets of carriers according to the transmit power control-index corresponding to the user equipment, and the transmit power control-index-offsets corresponding to the respective sets of carriers, wherein sets of carriers corresponding to the same transmit power control-radio network temporary identifier correspond to different transmit power control-indexes.

11. The user equipment according to claim 10, wherein in the first approach or the third approach, the processor executes the computer readable instructions to:

when a plurality of sets of carriers of the user equipment correspond to the same transmit power control-radio network temporary identifier, determine the locations, of the uplink transmit power control commands corresponding to the respective sets of carriers, in the detected physical downlink control channel scrambled with the transmit power control-radio network temporary identifier according to the transmit power control-indexes corresponding to the respective sets of carriers with the same transmit power control-radio network temporary identifier respectively, and obtain the uplink transmit power control commands corresponding to the respective sets of carriers at the corresponding locations.

12. The user equipment according to claim 9, wherein the transmit power control-radio network temporary identifier comprises a transmit power control-physical uplink control channel-radio network temporary identifier or a transmit power control-physical uplink shared channel-radio network temporary identifier.

13. A user equipment, comprising a memory configured to store computer readable instructions and a processor, wherein the processor executes the computer readable instructions to:

determine transmit power control-radio network temporary identifiers corresponding to respective sets of carriers and transmit power control-indexes corresponding to the respective sets of carriers, wherein Physical Uplink Control Channels are transmitted on different uplink carriers corresponding to different sets of carriers;

detect physical downlink control channels using the downlink control information format 3/3A and scrambled with the transmit power control-radio network temporary identifiers corresponding to the respective sets of carriers in common search spaces of search carriers corresponding to the respective sets of carriers respectively, wherein the search carrier corresponding to each set of carriers is such a carrier in the set of carriers that is preconfigured in higher-layer signaling or predefined with the network side; and determine the locations, of uplink transmit power control commands corresponding to the respective sets of carriers, in the physical downlink control channels detected on the search carriers corresponding to the sets of carriers according to the transmit power control-indexes corresponding to the sets of carriers respectively, and obtain the uplink transmit power control commands corresponding to the sets of carriers at the corresponding locations.

14. The user equipment according to claim 13, wherein the processor executes the computer readable instructions to determine the transmit power control-radio network temporary identifiers corresponding to the respective sets of carriers and the transmit power control-indexes corresponding to the respective sets of carriers by:

determining a transmit power control-radio network temporary identifier corresponding to the user equipment as indicated by higher-layer signaling or as predefined with the network side, wherein the transmit power control-radio network temporary identifier corresponding to the user equipment is used as the transmit power control-radio network temporary identifier corresponding to each set of carriers of the user equipment; and determining a transmit power control-index corresponding to the user equipment as indicated by higher-layer signaling or as predefined with the network side, wherein the transmit power control-index corresponding to the user equipment is used as the transmit power control-index corresponding to each set of carriers of the user equipment; or determining the transmit power control-indexes corresponding to the respective sets of carriers as indicated by higher-layer signaling or as predefined with the network side; or determining a transmit power control index corresponding to the user equipment, and transmit power control-index-offsets corresponding to the respective sets of carriers as indicated by higher-layer signaling or as predefined with the network side, and determining the transmit power control-indexes corresponding to the respective sets of carriers according to the transmit power control-index corresponding to the user equipment, and the transmit power control-index-offsets corresponding to the respective sets of carriers.

15. The user equipment according to claim 13, wherein the search carrier corresponding to each set of carriers is:
   a downlink carrier, in the set of carriers, paired with an uplink carrier, corresponding to the set of carriers, on which uplink control information is transmitted;
   or
   a downlink primary component carrier in the set of carriers.

16. The user equipment according to claim 13, wherein the transmit power control-radio network temporary identifier is a transmit power control-physical uplink control channel-radio network temporary identifier; or the transmit power control-radio network temporary identifier is a transmit power control-physical uplink shared channel-radio network temporary identifier.

* * * * *